United States Patent [19]
Toyoda et al.

[11] 3,747,438

[45] July 24, 1973

[54] SHIFT CONTROL SYSTEM FOR AUTOMATIC TRANSMISSION

[75] Inventors: Eiji Toyoda; Shin Ito; Seitoku Kubo, all of Toyota, Japan

[73] Assignee: Toyota Jidosha Kogyo Kabushiki Kaisha, Toyota-shi, Japan

[22] Filed: Mar. 28, 1972

[21] Appl. No.: 238,773

Related U.S. Application Data

[63] Continuation-in-part of Ser. No. 889,062, Dec. 30, 1969, abandoned.

[52] U.S. Cl. .................................. 74/866, 74/752 A
[51] Int. Cl. ...................... B60k 21/00, F16h 57/10
[58] Field of Search ............. 74/866, 752 A, 752 D, 74/731

[56] References Cited
UNITED STATES PATENTS

| | | | |
|---|---|---|---|
| 3,122,940 | 3/1964 | Shimwell et al. | 74/866 |
| 3,267,762 | 8/1966 | Reval | 74/866 X |
| 3,301,085 | 1/1967 | De Castel et al. | 74/866 |
| 3,433,101 | 3/1969 | Scholl et al. | 74/866 |
| 3,448,640 | 6/1969 | Nelson | 74/866 |

Primary Examiner—Arthur T. McKeon
Attorney—John W. Malley, G. Lloyd Knight et al.

[57] ABSTRACT

Improved shift control of the present invention is used in an engine driven vehicle having an automatic transmission. Load indicating apparatus responds to the operational load characteristics of the vehicle and produces outputs indicative of variations therein, while a responsively coupled first shift point computing apparatus effects the gear change signal for the transmission when the output indicates a certain load characteristic. A second shift point computer is responsively coupled to the load indicator and provides an output of a gradient operating circuit thereof in order to establish a gear change signal when the output of the load indicating apparatus establishes that a certain load characteristic exists which is co-relative to a gradient exceeding a selected amount.

26 Claims, 32 Drawing Figures

FIG. 16

SHIFT CONTROL SYSTEM FOR AUTOMATIC TRANSMISSION

REFERENCES TO RELATED APPLICATION

This is a continuation-in-part application of Ser. No. 889,062, now abandoned filed Dec. 30, 1969. The invention disclosed herein is an improvement in an AUTOMATIC TRANSMISSION SYSTEM of Wakamatsu et al. Ser. No. 874,934 now U.S. Pat. No. 3,675,511 filed Nov. 7, 1969. Further principles involved in a recently issued patent for another AUTOMATIC TRANSMISSION SYSTEM, of Wakamatsu et al., U.S. Pat. No. 3,641,844 issued Feb. 15, 1972, are incorporated in various parts of the present disclosure and reference thereto will be noted herein.

BACKGROUND OF THE INVENTION

This invention relates to transmissions for vehicles and more particularly to a combined electrical and hydraulic control system for use with automatic transmissions.

In automatic transmissions generally employed heretofore in automotive vehicles, all the complex controls including shift control have been carried out by means of fluid pressures. Thus, the signal detecting means in the conventional automatic transmission has necessarily had a complex structure and has been defective in that the detected signals in the form of fluid pressures are subject to errors, and accurate control cannot be expected. Further, it has not been an easy matter to impart to the hydraulic actuating circuit in the transmission an improved and complex function over any existing function.

In an attempt to overcome these prior defects, the present invention contemplates electrical control of shift signal control means in such a transmission.

The shift point control in the conventional automatic transmission has been such that the speed ratio is determined by comparing a vehicle speed responsive signal with an engine torque responsive signal. Thus, according to the prior art shift point control, the speed ratio is determined depending on the relation between the vehicle speed responsive signal and the engine torque responsive signal, and the vehicle speed at which a shift occurs is predetermined when the engine torque responsive signal is fixed. The system according to the present invention includes, in addition to means for carrying out such shift point control, circuit means for differentiating the vehicle speed responsive signal thereby generating a signal responsive to the rate of variation of the vehicle speed or the acceleration of the vehicle, and circuit means for computing the acceleration of the vehicle on the basis of the vehicle speed responsive signal and engine torque responsive signal. In the present invention, the acceleration of the vehicle when driving on a road surface is compared with a reference acceleration when driving on a reference road surface so as to detect the gradient or inclination of the specific road surface on which the vehicle is driving, thereby modifying the known relation between the vehicle speed responsive signal and the engine torque responsive signal depending on the gradient of the specific road surface. Thus, the vehicle speed at which a shift in the gear position occurs is not primarily determined by the engine torque responsive signal, and varies depending on the inclination of the specific road surface on which the vehicle is driving even when the throttle valve opening is maintained constant. More precisely, it is an important feature of the present invention that a shift from low to high gear occurs at a vehicle speed of 50 km/h with a throttle valve opening of 50 percent and wherein the vehicle encounters a mountainous or any other area having a gradient in excess of, for example, 5 percent, whereas the shift from low to high gear occurs at a vehicle speed of 30 km/h with the same throttle valve opening and encounters a substantially level road surface having a gradient of 5 percent at the most.

By the use of the shift control system described hereinafter, various difficulties encountered with conventional automatic transmissions, in which only one shift pattern for driving on a level road is provided, may be eliminated. Suppose that a vehicle equipped with a conventional automatic transmission and running in a relatively low speed range of the third gear of this shift pattern enters a mountainuous area and starts to run up a steep incline. Since, in such a state, the running resistance is increased due to the slope and the accelerating force is descreased, the accelerator pedal must be forced down to cause a downshift to second gear to accelerate the vehicle, however subsequent release of the force imparted to the accelerator pedal immediately causes an upshift to third gear, with the result that the accelerating force is abruptly decreased. Thus, it is difficult to carry out the desired driving by adjusting the amount of depression of the accelerator pedal. Various difficulties encountered with the conventional automatic transmission are obviated by the present invention in which a shift pattern for driving in a mountainous area and a shift pattern for driving on a level road are provided for giving variable shift points between low and high gear so that these two shift patterns can be automatically switched over by an operating circuit adapted for detecting a gradient. By this arrangement, a suitable shift point can be automatically obtained for all driving conditions, and an automatic shift operation which is advanced over that of the conventional automatic transmission can thereby be effected.

Further when difficulties arise due to possible malfunction of the automatic controls of the transmission it may be advisable to manually shift when different road conditions arise. Sometimes however it may be impossible to deactivate the electrical controls of the transmission and such a situation could cause erratic operation of the vehicle.

It may also be the drivers wish to manually shift the transmission in order to enjoy a sporty ride, and as such provision has been made therefor.

It is therefore an object of the present invention to provide a system which obviates one or more of the limitations of the described prior arrangements. It is another object of the present invention to provide a system which operates differently under various associated road conditions.

It is yet another object of the invention that when some trouble occurs in the shift signal control system, the driver may selectively activate a system for driving under a manual shift.

A further object of the invention is provided such that even when no trouble occurs in the shift signal control system, the driver may selectively activate a system when he wishes a sporty drive under a manual shift.

It is yet another object of the invention that the driver may freely select the driving ratio or speed ratio as he whishes.

It is still another object that the vehicle may run selectively under a full automatic shift control or a manual shift control.

It should be noted in regard to this disclosure that it is possible to control an automatic transmission utilizing various techniques. For example the Wakamatsu U.S. Pat. No. 3,641,844 referenced to previously utilizes slip ratio parameters which are analyzed by appropriate apparatus to yield control signals which effectuate gear engagements accordingly. The Wakamatsu application Ser. No. 874,934 on the other hand utilizes engine load and vehicle speed as parameters including throttle position to effectuate said different gear engagements.

It is therefore apparent to those skilled in the art that many operational variables may be available to provide the necessary inputs to a control system for providing adequate controls. For example, slip ratios provide vehicle speed and engine load parameters as does throttle position and vehicle speed and it is therefore necessary to understand that the means of accomplishing a particulars control function is flexible with respect to the type of input, i.e., slip ratios versus throttle position. It can be seen that the transmission of the Wakamatsu patent may be adapted to the control system of the present invention and vice versus. Similarly the hydraulic controls may likewise be interchanged without extensive modification.

It is therefore intended herein to disclose an automatic transmission capable of automatic shifting under manual conditions as defined by selected operational parameters and one which will operate under adverse conditions such as hills and mountains. It should be pointed out here that a patent to Shirai et al. U.S. Pat. No. 3,572,168 issued Mar. 23, 1971 for AUTOMATIC TRANSMISSIONS and an improvement thereon by Sakaibara et al. Ser. No. 73,158 for ELECTRICAL AUTOMATIC SHIFT CONTROL SYSTEM HILLY COUNTRY DETECTING UNIT are referred herein for purposes of providing background to this disclosure and pointing out differences in the different systems available in the art.

There has been provided an improved shift control for use in an engine driven vehicle having an automatic trans-mission. The improved shift control utilizes a load indicating apparatus which is responsive to operational load characteristics of the vehicle and produces outputs which indicate variations in those characteristics, while a first shift point computing apparatus responds to the load indicator and effects gear change signals for the transmission when certain load characteristics exist. A second shift point computer is also responsively coupled to the load indicator and utilizes a gradient operating circuit to produce an output producing a gear change signal when an output of the second shift point computer indicates a load characteristic co-relative with a gradient exceeding a certain amount.

BRIEF DESCRIPTION OF THE DRAWING

FIG. 12 is a block diagram of the shift signal control system according to the present invention;

FIG. 14 is a block diagram similar to FIG. 12, but showing the system in its control operation for second speed;

FIG. 16 is a block diagram showing how a logical operation for a downshift from third speed to second speed takes place in response to a signal from a second shift point computing circuit while the vehicle is running at third speed;

DESCRIPTION OF THE PREFERRED EMBODIMENT

Figure 1:
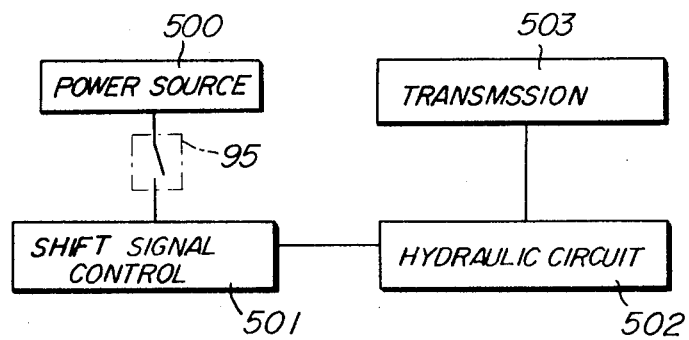
FIG. 1 is a block diagram of an automatic transmission including an automatic shift signal control system embodying the present invention.

Referring to FIG. 1, an automatic transmission to which the present invention is applied is shown in a block diagram and comprises an electrical power source 500, a shift signal control system 500, a hydraulic actuating system 502, a transmission unit 503, and a switch 95 connecting the shift signal control system 501 with the electrical power source 500.

The components of the automatic transmission will be described in detail hereunder.

STRUCTURE OF TRANSMISSION

Figure 2:
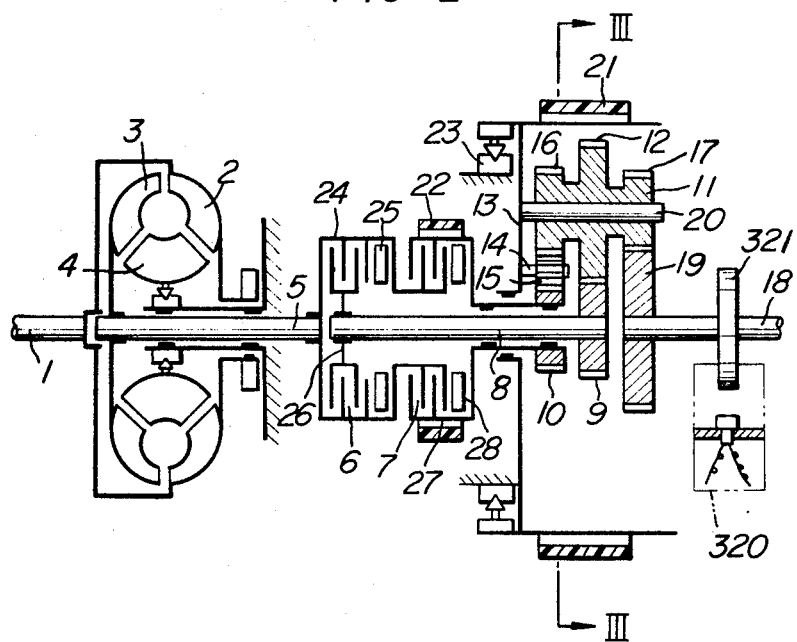
FIG. 2 is a schematic sectional view of a transmission unit in the automatic transmission.

A torque converter automatic transmission having three forward speeds and one reverse speed as shown in FIG. 2 will be taken as a typical example of the automatic transmission. In FIG. 2, the structure of such a fluid controlled automatic transmission is schematically shown.

Figure 3:
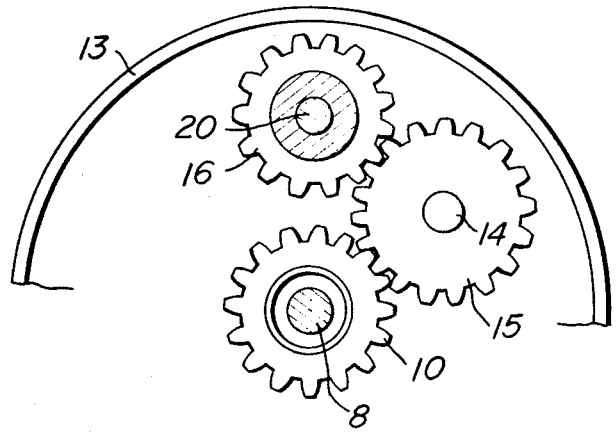
FIG. 3 is a partially sectional view taken on the line III—III in FIG. 2, showing in detail the relation between an idler gear not shown in FIG. 2 and a reverse sun gear and a planet pinion.

A torque converter unit includes a pump impeller 2 directly connected to a crankshaft 1 of an engine. The power developed by the engine is transmitted from the pump impeller 2 to a turbine impeller 3 through the medium of hydraulic fluid, and the fluid is returned to the pump impeller 2 again by being guided by a stator 4. A rotational force can be continuously derived from a turbine shaft 5 by the repetition of the above flow of the fluid. This rotational force is transmitted from the turbine shaft 5 to a gear unit disposed at the output side of the torque converter unit. As is commonly known, multiple disc clutch means 6 and 7 and brake band means 21 and 22 are automatically controlled by fluid pressure supplied from associated servo means as required and cooperate with a planetary gear mechanism shown in more detail in FIG. 3 to provide three forward speeds and one reverse speed.

The structure of the gear unit disposed at the output side of the torque converter unit will now be described. The turbine impeller 3 is connected to the turbine shaft 5 which acts as a power input shaft of the planetary gear mechanism. The turbine shaft 5 is splined to a drum 24 for unitary rotation therewith. Disposed within the drum 24 is a multiple disc clutch 6 (hereinafter to be referred to as a front clutch) which is engaged by means of a piston 25 actuated by fluid pressure and is released by means of back-up springs. The driving plates of the front clutch 6 are externally splined to engage the internally splined portion of the drum 24, and the clutch discs are internally splined to engage the externally splined portion of a hub 26 so as to be locked against free rotation. The hub 26 is internally splined to engage the externally splined portion of an intermediate shaft 8. The clutch discs of a multiple disc clutch 7 (hereinafter to be referred to as a rear clutch) are internally splined to engage the externally splined portion of the front clutch drum 24 as shown so as to be locked against free rotation. Thus, the clutch discs of the rear clutch 7 rotate in unison with the front clutch drum 24. The driven plates of the rear clutch 7 are externally splined to engage the internally splined portion of a clutch drum 27 of the rear clutch 7. The rear clutch 7 is engaged by means of a fluid pressure actuated piston 28 and is disengaged when the fluid pressure applied to the piston 28 is released.

The intermediate shaft 8 which is splined to the hub 26 of the front clutch 6 is connected at its rear end to an input sun gear 9. The rear clutch drum 27 is fixed to a reverse sun gear 10 by a suitable locking means. The input sun gear 9 meshes with each gear 12 of a plurality of, for example, two or three planet pinions 11. The reverse sun gear 10 meshes with idler gears 15 (shown in FIG. 3) which are each rotatably mounted on a pin 14 fixed at one end to a carrier 13, and the idler gears 15 in turn meshes with gears 16 or the planet pinions 11.

The rearmost gear 17 of each planet pinion 11 meshes with a gear 19 mounted at the front end of an output shaft 18 of the transmission. The planet pinions 11 having the gears 16, 12 and 17 and the idler gears or pinions 15 are carried by the carrier 13 by means of pinion pins 20 and 14, respectively. A brake band 21 (hereinafter to be referred to as a rear brake band) encircles the carrier 13 for applying the brake to the latter, and thus the carrier 13 can be secured against rotation and allowed to freely rotate by fastening and releasing the rear brake band 21. Similarly, a brake band 22 (hereinafter to be referred to as a front brake band) encircles the rear clutch drum 27 so that the rear clutch drum 27, hence the sun gear 10 can be fixed against rotation and allowed to freely rotate by fastening and releasing the front brake band 22. A one-way clutch 23 associated with the carrier 13 in a manner similar to the rear brake band 21 in low gear will be set forth hereunder.

The one-way clutch 23 is actuated with the shift valve in D each time a rear brake actuator is called for. In such a case the one-way clutch 23 when activated permits rotation of carrier 13 in the rotational direction of the engine (i.e., clockwise) however it does permit rotation of carrier 13 if the wheels of the vehicle are rotating faster than the engine. This can occur when the vehicle is moving downhill. The one-way clutch is similar in nature to a starter clutch which only permits rotation in one direction but may be overridden by rotation of the starter ahead of the rotation of the clutch. This example should make clear that the one-way clutch does not provide engine braking to the vehicle because it permits free wheeling of the vehicle when engaged.

It should be noted in this respect that the vehicle when actuated manually by the shift valve 120 engages the rear brake 21 under appropriate conditions explained hereinafter. Therefore the one-way clutch 23 is only effective to operate under automatic conditions with the shift lever in the D position. Further the one-way clutch 23 has no effect when actuated to hold carrier 13 from moving clockwise since it is designed to hold the carrier only against counterclockwise relation in relation to the clockwise rotation of the engine.

With the above structure, three forward speeds and one reverse speed can be obtained by selectively actuating the elements described above in a manner as follows:

First speed

The front clutch 6 and the rear brake band 21 are actuated (However, when the transmission is driven from the engine, the rear brake band 21 may not be actuated since as previously described the one-way clutch 23 is actuated to give the same result as that obtained with the actuation of the rear brake band 21. With the front clutch 6 and the rear brake band 21 actuated, the rotation of the turbine shaft 5 is directly transmitted to the input sun gear 9 through the front clutch 6. Due to the fact that the carrier 13 is locked against rotation by the rear brake band 21, the pinion pins 20 are also held stationary and the rotation of the turbine shaft 5 is transmitted from the gear 9 to the gears 12, hence through the gears 17 to the gear 19 on the output shaft 18 in a speed reducing relation similar to that of an ordinary gear train, thereby providing the first speed.

Second speed

The front clutch 6 is kept actuated and the front brake band 22 is actuated while releasing the rear brake band 21 in this case. Thus, the input sun gear 9 is rotated in unison with the turbine shaft 5, but the rear clutch drum 27, hence the reverse sun gear 10 is locked against rotation by the front brake band 22. In this state, the rotation of the turbine shaft 5 is directly transmitted to the input sun gear 9, and the input sun gear 9 urges the pinions 11 to rotate in a direction (counterclockwise) opposite to the direction of rotation (clockwise) of the turbine shaft 5. The planet pinions 11 rotating in this direction attempt to rotate the idler gears 15 clockwise through the gears 16. However, due to the fact that the gear 10 meshing with the gears 15 is locked against rotation, the pinion pins 14 revolve clockwise around the gear 10. This revolving motion is imparted to the rotation of the input sun gear 9 and the gear 19 carried by the output shaft 18 which gears are coaxial with and rotate in the same direction as the turbine shaft 5. Since the number of teeth of the gear 12 is selected to be greater than the number of teeth of the gear 17, the number of revolutions of the intermediate shaft 8 is greater than that of the output shaft 18. In other words, the output shaft 18 is rotated at a reduced speed or second speed.

Third speed

The third speed can be obtained by engaging both the respective front and rear clutches 6 and 7. The input sun gear 9 and the reverse sun gear 10 are rotated in unison and the whole planetary gear system is unitarily rotated so that the output shaft 18 is rotated at the rotating speed of the turbine shaft 5.

Reverse

When reversing, the rear clutch 7 and the rear brake band 21 are actuated. The carrier 13, hence the pinion pins 14 and 20 associated therewith are thereby locked against revolution, and the rotation of the turbine shaft 5 is transmitted through the rear clutch 7 to the reverse sun gear 10, thence the gear clutch 7 to the reverse sun gear 10, thence through the pinions 15 and 17 to the gear 19 mounted on the output shaft 18 so that the output shaft 18 is rotated in the reverse direction.

The condition of the front and rear clutches is described in the following table to summarize the various operations.

|  | First Speed | Second Speed | Third Speed | Reverse |
|---|---|---|---|---|
| Front Brake | Off | On | Off | Off |
| Rear Brake | On | Off | Off | On |
| Front Clutch | On | On | On | Off |
| Rear Clutch | Off | Off | On | On |

HYDRAULIC ACTUATING SYSTEM

The arrangement of a hydraulic actuating system according to the present invention is diagrammatically shown in FIGS. 4 through 10. Briefly, the hydraulic actuating system comprises a fluid pressure source 100 and a hydraulic actuating circuit 110. The hydraulic actuating circuit 110 includes a manual valve 120, a 1 – 2 shift means 130, a 2 – 3 shift means 135, a check valve 140 and fluid passages. The fluid pressure source 100 includes an oil pump 101, an oil strainer 102, a pressure regulator valve 105, a check valve 103, an oil cooler 104 and fluid passages. The fluid pressure soucre functions to supply fluid under pressure to the torque converter, to the gears for lubricating same and to the hydraulic actuating circuit.

Figure 4:
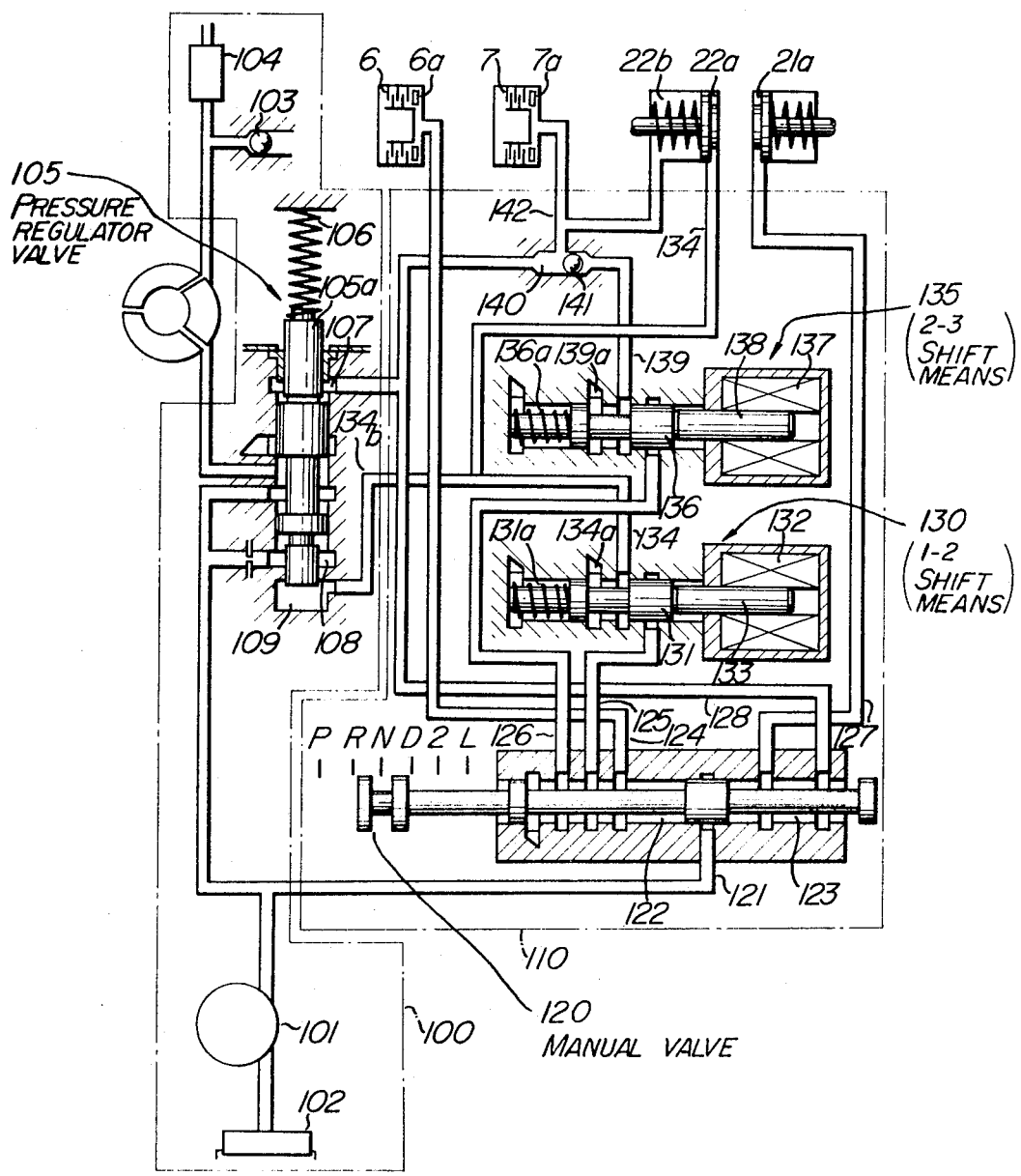
FIGS. 4 through 10 are diagrammatic views illustrating the operation of a hydraulic actuating circuit when the present invention is adapted to a three-forward speed automatic transmission in which the hydraulic actuating circuit is shown iN its N position, D position-1st speed, D position-2nd speed, D position-3rd speed, 2 position-2nd speed, L position and R position, respectively.
Figure 5:
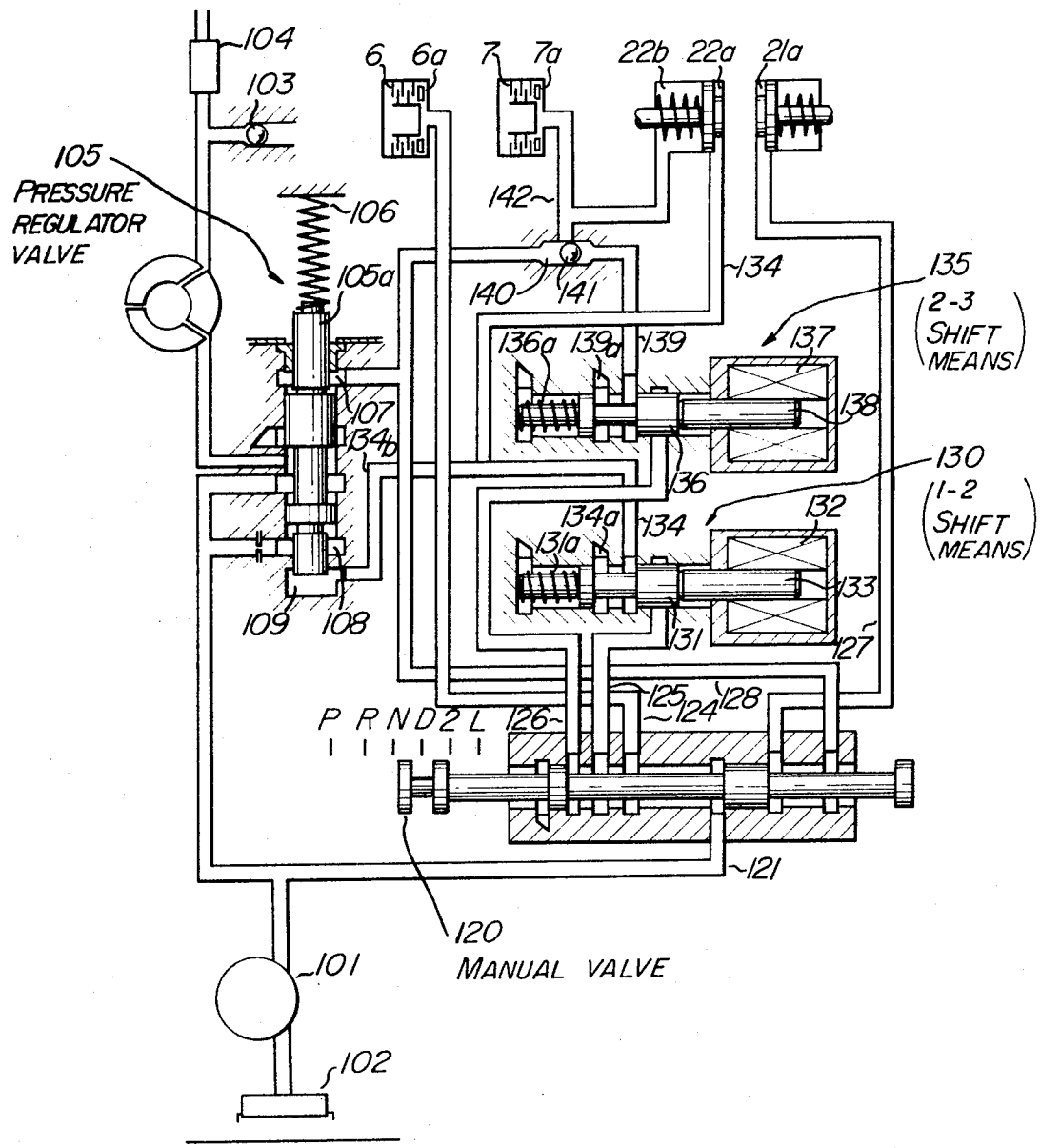

The manual valve 120 is connected with a shift lever (not shown) disposed adjacent to the driver's seat and takes one of the P, R, N, D, 2 and L positions. When the manual valve 120 takes the N position, a fluid passage 121 is closed and valve chambers 122 and 123 are exhausted as seen in FIG. 4. At the D position of the manual valve 120, the fluid passage 121 communicates with fluid passages 124, 125 and 126 as seen in FIG. 5. The fluid passage 124 leads directly to a front clutch servo chamber 6a, and the fluid passage 125 leads to the applying side 22a of a servo for the front brake band 22 through the 1 – 2 shift means 130, while the fluid passage 126 leads to a rear clutch servo chamber 7a and to the release side 22b of the servo for the front brake band 22 through the 2 – 3 shift means 135 and the check valve 140. The 1 – 2 shift means 130 includes a 1 – 2 shift valve element 131 and a solenoid 132. One end (or right-hand end as viewed in the drawing) of the valve element 131 is abutted by a moving core 133 of the solenoid 132. When no current is supplied to the solenoid 132, the valve element 131 is urged to its rightward position by a spring 131a engaging the other or left-hand end of the valve element 131 so that the fluid passage 125 communicates with a fluid passage 134 to supply fluid to the applying side 22a of the servo for the front brake band 22 to apply the front brake band 22. When current is supplied to the solenoid 132, the moving core 133 urges the valve element 131 to the leftward position by being actuated by the electromagnetic force of the solenoid 132 so that communication between the fluid passages 125 and 134 is interrupted and the fluid passage 134 communicates with a pressure discharge port 134a to release the front brake band 22. Similarly, the 2 – 3 shift means 135 includes a 2 – 3 shift valve element 136 and a solenoid 137. One end (or right-hand end as viewed in the drawing) of the valve element 136 is engaged by a moving core 138 of the solenoid 137. When no current is supplied to the solenoid 137, the valve element 136 is urged to its rightward position by a spring 136a engaging the other or left-hand end of the valve element 136 so that the fluid passage 126 communicates with a fluid passage 139 to force a check ball element 141 of the check valve 140 toward the fluid passage 128 to block the fluid passage 128. As a result, the fluid passage 139 communicates with a fluid passage 142 to supply fluid to the rear clutch servo chamber 7a and to the release side 22b of the servo for the front brake band 22 so as to engage the rear clutch 7 and release the front brake band 22. When current is supplied to the solenoid 137, the valve element 136 is urged leftward so that communication between the fluid passages 126 and 139 is interrupted and the fluid passage 139 communicates with a pressure discharge port 139a to be exhausted.

In the first speed at the drive range position or D position-1st speed shown in FIG. 5, both the solenoids 132 and 137 are energized and the front clutch 6 is solely engaged by the supply of fluid to the front clutch servo chamber 6a through the fluid passage 124. Accordingly, when the transmission is driven from the engine, the one-way clutch 23 is engaged to lock the carrier 13 against rotation so that the first speed can be obtained. In this case, however, no driving force can be transmitted from the output shaft 18 since the freewheeling condition appears. In other words as described previously in the D position actuation of the one-way clutch occurs to lock the carrier 13 of the planetary gear system only against rotation by the engine, but not against free wheeling rotation of the rear wheels. While when placed in the L condition rear brake 21 engages the carrier 13 to prevent free wheeling and thus transmit rotational effort of the rear wheels forward through the transmission for purposes of engine braking.

Figure 6:
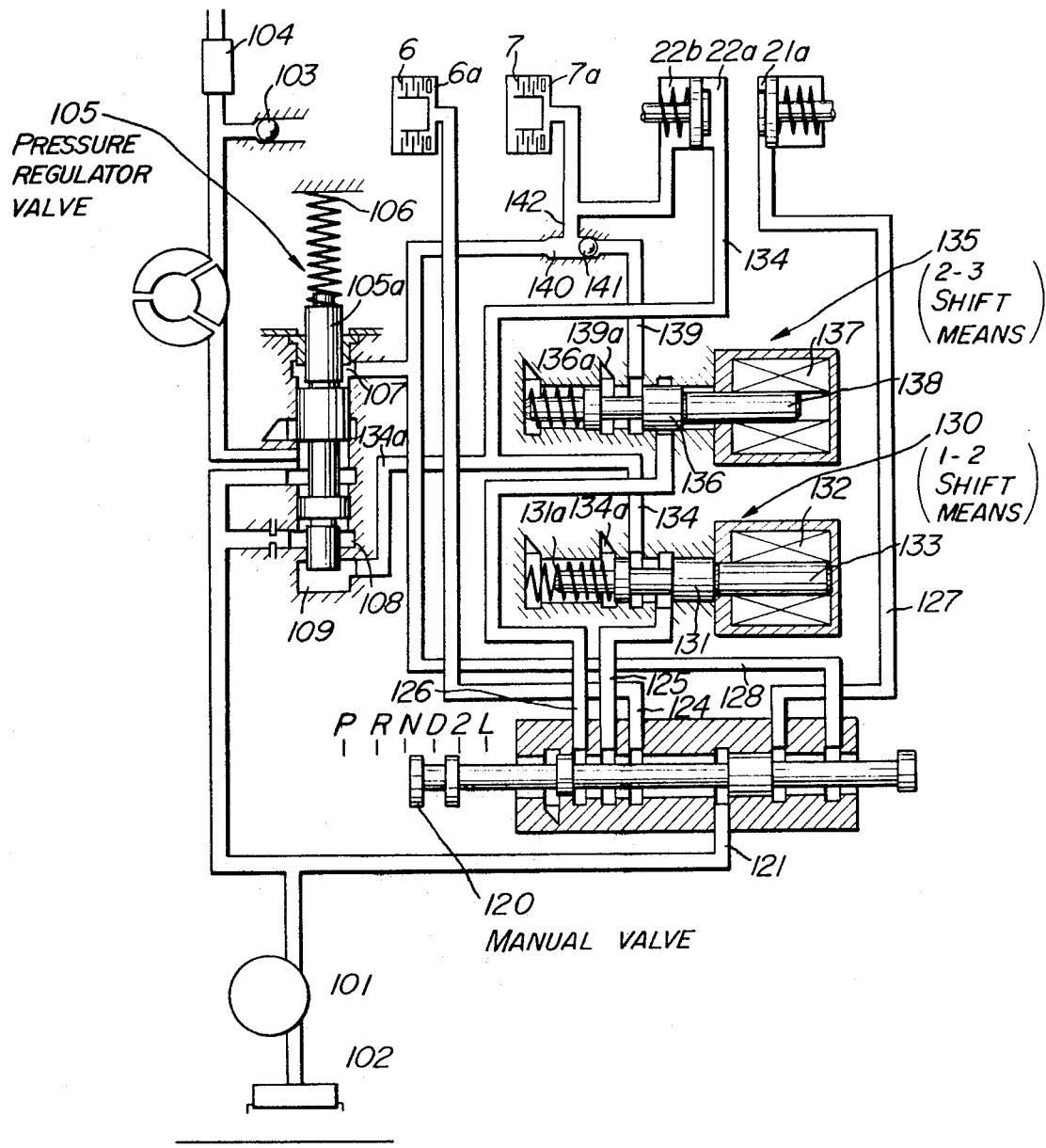

In the second speed at the drive range position or D position-2nd speed shown in FIG. 6, the fluid passage 124 leading to the front clutch servo chamber 6a is kept pressurized and the solenoid 132 for the 1 – 2 shift valve element 131 is de-energized with the result that the fluid passage 125 communicates with the fluid passage 134 to supply fluid to the applying side 22a of the servo for the front brake band 22 to apply the front brake band 22. Thus, the second speed can be obtained.

Figure 7:
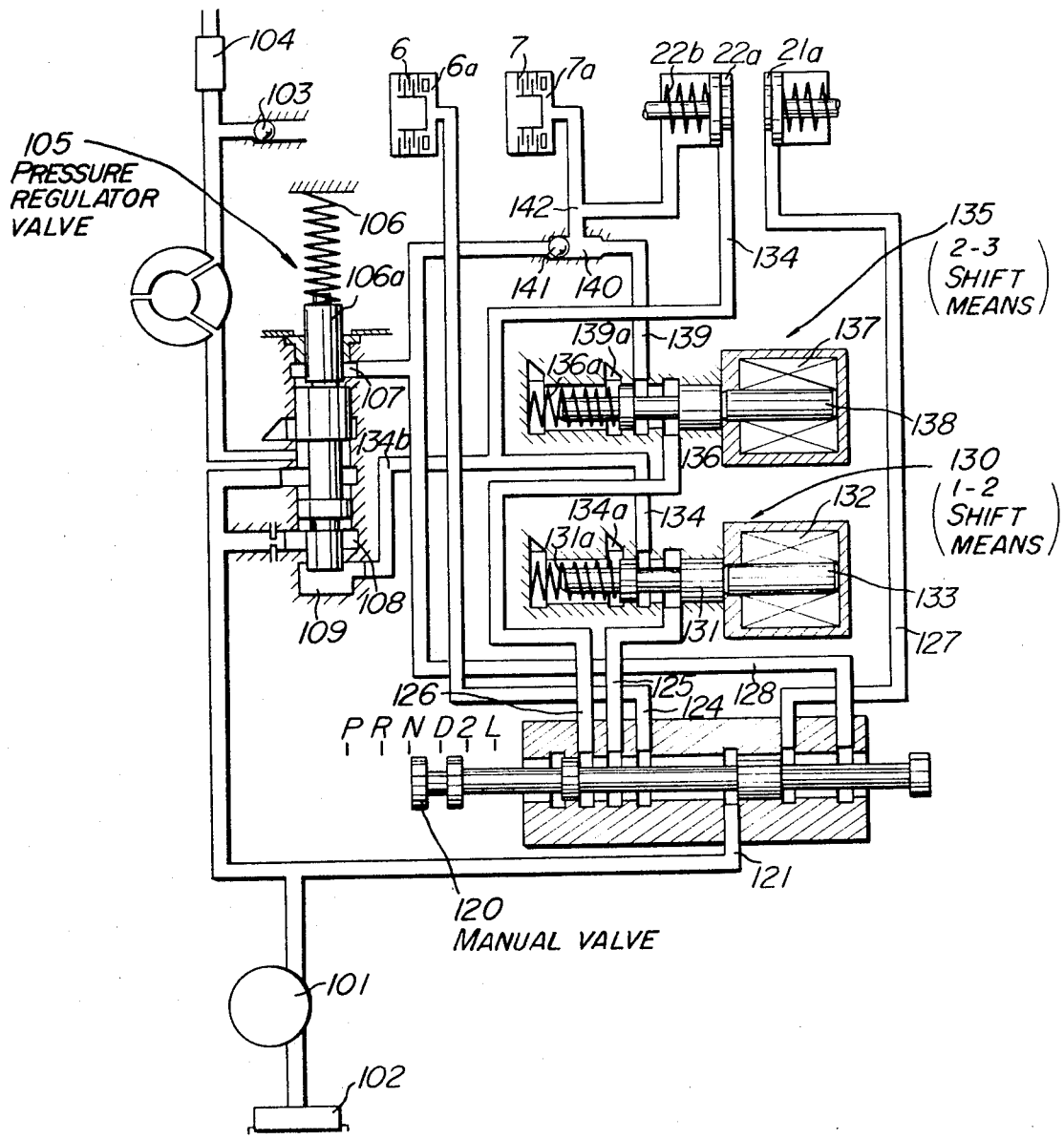

In the third speed at the drive range position or D position-3rd speed shown in FIG. 7, the solenoid 137 for the 2 – 3 shift valve element 136 is de-energized in addition to the previous de-energization of the solenoid 132 in the D position-2nd speed with the result that the fluid passage 125 communicates with the fluid passage 139 to supply fluid to the rear clutch servo chamber 7a to engage the rear clutch 7 while releasing the front brake band 22. Thus, the third speed can be obtained.

Figure 8:
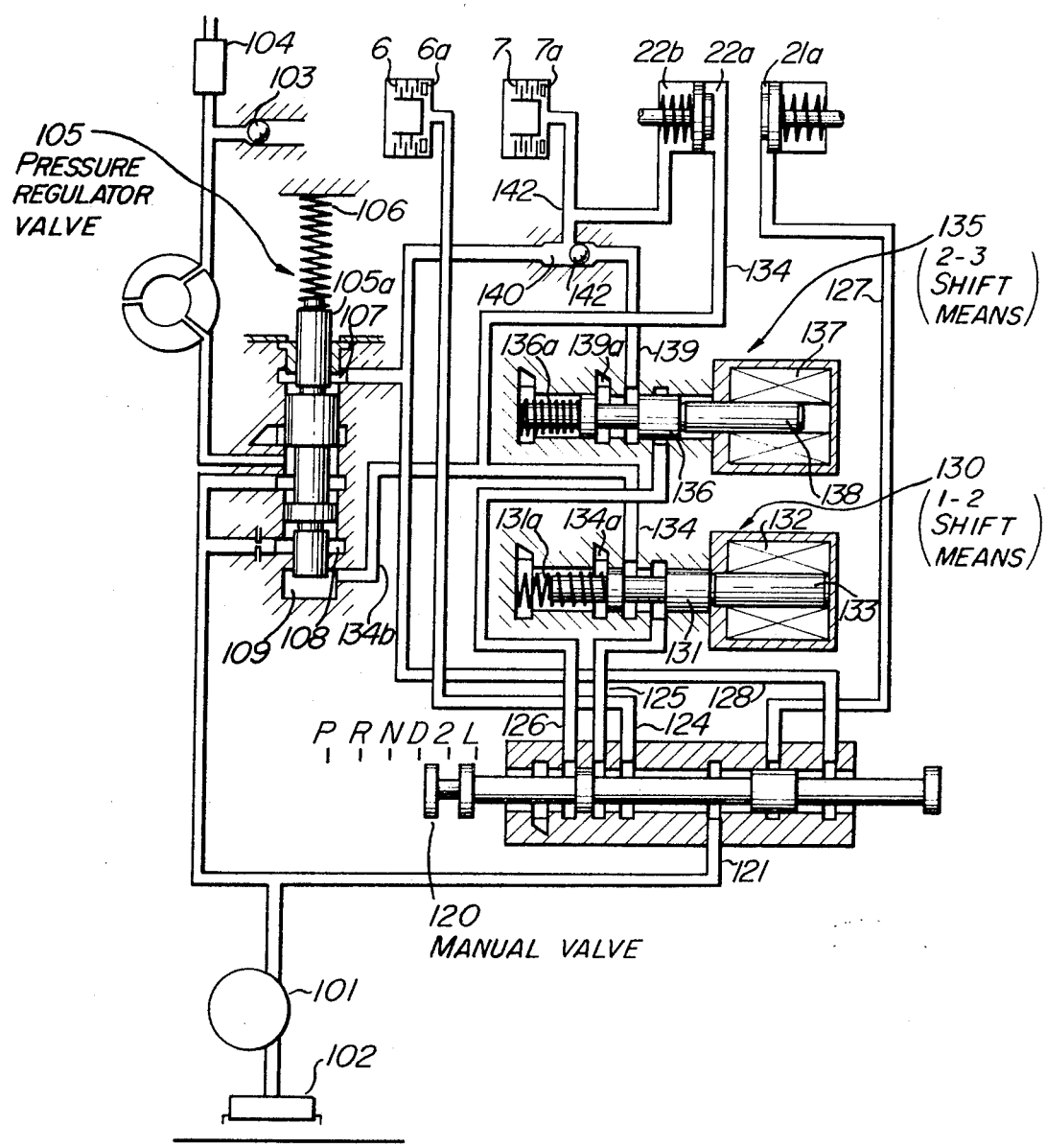

When the manual valve 120 is urged to the 2 position shown in FIG. 8, the fluid passage 126 leading to the 2 – 3 shift means 135 is exhausted and the fluid passages 124 and 125 communicate solely with the fluid pressure source 100. Accordingly, it is impossible to obtain the third speed regardless of de-energization of the solenoid 137 for the 2 – 3 shift valve element 136 and the first and second speeds can be obtained depending on the energization and de-energization of the solenoid 132 for the 1 – 2 shift valve element 131.

Figure 9:
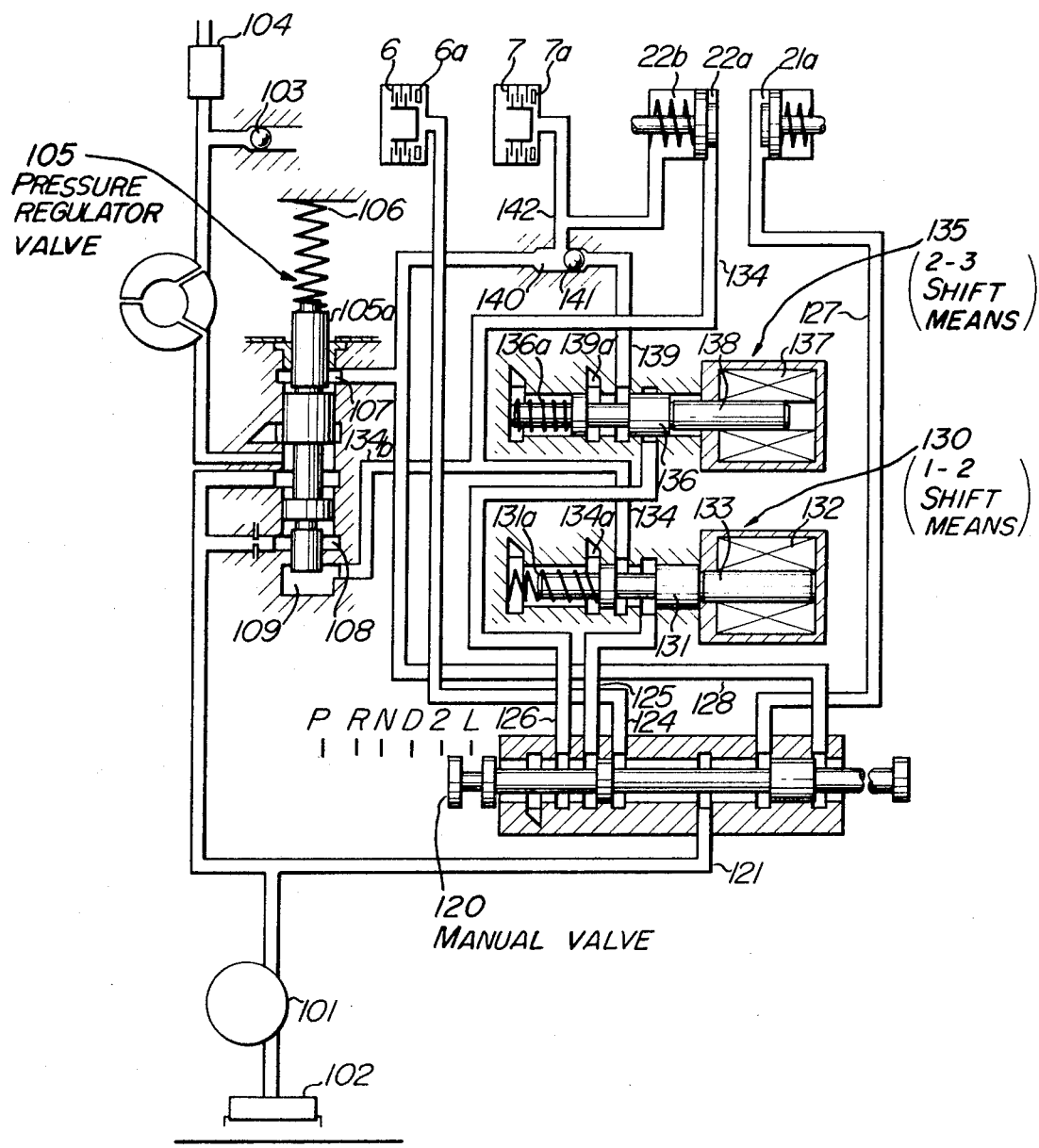

When the manual valve 120 is urged to the L position shown in FIG. 9, the fluid passages 125 and 126 are exhausted and the fluid passages 124 and 127 communicate with the fluid pressure source 100. As a result, fluid is supplied to the front clutch servo chamber 6a and to the applying side 21a of a servo for the rear brake band 21 to engage the front clutch 6 and apply the rear brake band 21. Thus, the first speed can be obtained. The first speed in this case differs from the first speed in the D position in that the rear brake band 21 is applied to provide for transmission of the driving force from the output shaft to the engine thereby permitting application of engine braking.

Figure 10:
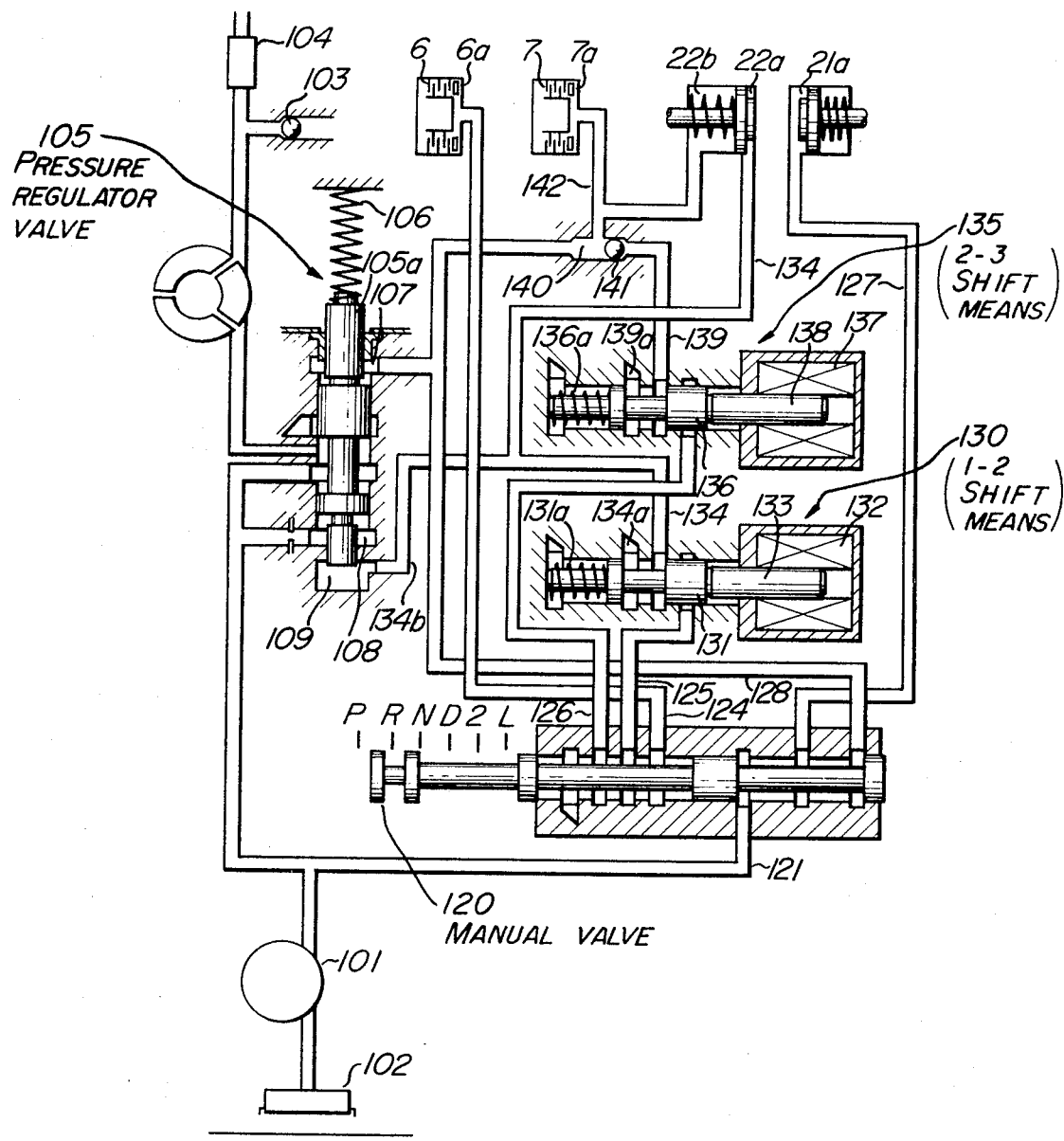

When the manual valve 120 is moved to the R position shown in FIG. 10, the fluid passages 124, 125 and 126 are exhausted and the fluid passages 127 and 128 communicate with the fluid pressure source 100. As a result, fluid is supplied to the rear clutch servo chamber 7a and to the applying side 21a of the servo for the rear brake band 21 to engage the rear clutch 7 and apply the rear brake band 21. Thus, the reverse drive condition for the vehicle can be obtained.

It will be understood from the foregoing description that the hydraulic actuating system in the present invention is featured by the fact that it comprises the combination of a novel hydraulic circuit arrangement and biasing means in the form of the springs 131a and 136a for biasing the 1 – 2 shift valve element 131 and the 2 – 3 shift valve element 136 to the upshift position in responsve to de-energization of the respective solenoids 132 and 137. The circuit arrangement of the hydraulic actuating system is such that, in the D positions of the manual valve 120, fluid pressure from the fluid pressure source 100 is supplied to the front clutch servo chamber 6a for the front clutch 6 through the fluid passage 124, to the applying side 22a of the servo for the front brake band 22 through the fluid passage 125 and the 1 – 2 shift means 130, and to the rear clutch servo chamber 7a for the rear clutch 7 and to the release side 22b of the servo for the front brake band 2 through the fluid passage 126 and the 2 – 3 shift means 135, respectively. In the 2 position of the manual valve 120, the fluid passage 126 leading to the 2 – 3 shift means 135 is exhausted and the fluid passages 124 and 125 communicate with the fluid pressure source 100, while in the L position of the manaul valve 120, the fluid passage 125 leading to the 1 – 2 shift means 130 is further exhausted and the fluid passage 124 leading to the front clutch servo chamber 6a for the front clutch 6 and the fluid passage 127 leading to the applying side 21a of the servo for the rear brake band 21 communicate with the fluid pressure source 100.

By virtue of the above combination, even when the power supplied from the electrical power source to the shift signal control system is interrupted, the manual valve 120 may be urged to the L position for obtaining the first speed, to the 2 position for obtaining the second speed and to the D position for obtaining the third speed. Such a hydraulic circuit arrangement is quite advantageous in that, when trouble occurs in the shift signal control system which controls the supply of electrical signals to the solenoids or when the driver wishes a sporty drive with a variety of speed changes compared with those carried out on the basis of the shift points primarily set for the electrical control system, the driver may turn off the switch connecting the voltage source with the shift signal control system to cut off the supply of power to the shift signal control system thereby rendering the shift signal control system inoperative and may then shift the shift lever to one of the L, 2 and D positions so as to select the speed ratio desired by the driver. In other words, the switch 95 of FIG. 1 may be turned on and off to select either driving under a full automatic shift control or driving under a manual shift control as desired. It may be convenient to adapt a dash mounting for switch 95 for manual control by the driver or more conveniently utilize the manual shift lever (not shown) to disengage switch 95. In either case loss of energy to the system permits operation of the shift control system by manual actuation of the shift lever operating the shift valve 120.

A second feature of the present invention resides in the fact that the freewheeling drive appears in the D position-first speed so as to ensure the safety against any erratic first speed signal that may be supplied from the shift signal control system in the high speed driving.

A third feature of the present invention resides in the fact that the solenoids 132 and 137 are in the deenergized state during running of the vehicle in the third speed gear. Therefore, it is unnecessary to consider any electrical power consumption due to operation of solenoids as well as undesirable generation of heat resulting in a temperature rise due to the current supplied to the solenoids.

Fluid pressure supplied to the servos is controlled by the pressure regulator valve 105. The pressure regulator valve 105 includes a valve spool 105a which is urged at one or upper end by a spring 106. In the R position of the manual valve 120, fluid pressure is supplied through a fluid passage 128 to a valve chamber 107 surrounding the upper portion of the valve spool 105a. Spaced valve chambers 108 and 109 surround the lower portion of the valve spool 105a so that fluid pressure is supplied from the oil pump 101 to the chamber 108 and fluid pressure is supplied to the chamber 109 through a fluid passage 134b. In the D or 2 position of the manual valve 120, fluid pressure is supplied to the fluid passage 125 leading to the 1 – 2 shift means 130. Then, when the 1 – 2 shift solenoid 132 is de-energized, the valve element 131 is urged to the upshift position to establish communication between the fluid passages 125 and 134 so that fluid pressure is supplied to the chamber 109 through the fluid passage 134b. On the other hand, the chamber 107 is exhausted in the gear positions except in the reverse position. Thus, a constant low fluid pressure $P_{LL}$ which is determined by the spring pressure of the spring 106 and fluid pressures in the chambers 108 and 109 is produced by the pressure regulator valve 105.

When the manual valve 120 is in the D or 2 position and the 1 – 2 shift valve element 131 is urged to the downshift position (corresponding to the first speed) by the operation of the solenoid 132 or when the manual valve 120 is in the L position, the chamber 109 of the pressure regulator valve 105 is exhausted and a constant fluid pressure $P_L$ which is determined by the spring pressure of the spring 106 and fluid pressure in the chamber 108 is produced by the pressure regulator valve 105. In the R position of the manual valve 120, fluid pressure is supplied to the chamber 107 of the pressure regulator valve 105 through the fluid passage 128. Accordingly, a constant high fluid pressure $P_{LH}$ which is determined by the spring pressure of the spring 106 and fluid pressures in the chambers 107 and 108 is produced by the pressure regulator valve 105.

It will be understood from the above description that the fluid passage 134 leading out from the 1 – 2 shift means 130 is connected to the pressure reducing chamber 109 of the pressure regulator valve 105 so that the fluid pressure produced by the pressure regulator valve 105 is reduced when the 1 – 2 shift valve element 131 is shifted to the high gear position.

Figure 11:
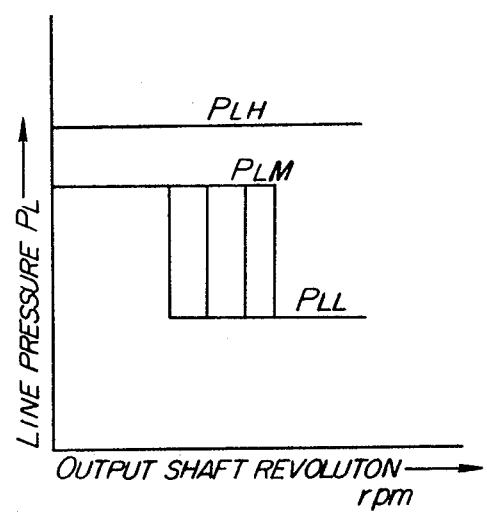
FIG. 11 is a graph showing how the line pressure $P_{LL}$ controlled by the hydraulic actuating circuit varies relative to the r.p.m. of the output shaft.

FIG. 11 shows the variation in the fluid pressure or line pressure $P_L$ produced by the pressure regulator valve 105 relative to the number of revolutions of the output shaft 18, hence the vehicle speed. As will be seen from FIG. 11, a step-down from the constant fluid pressure $P_{LM}$ to the fixed low fluid pressure $P_{LL}$ occurs in the 2 or D position of the manual valve 120 when the number of revolutions of the output shaft 18, hence the vehicle speed is increased and the speed ratio is changed from the first to second speed. Generally, the 1 – 2 shift point and 2 – 1 shift point are variable, depending on the engine torque responsive signal. Thus, the stepdown point from the constant fluid pressure $P_{LM}$ to the constant low fluid pressure $P_{LL}$ varies as shown depending on the engine torque responsive signal.

By virtue of the capability of obtaining the control pressure characteristic in the manner described in detail above, a line pressure taking into consideration the torque multiplying action of the torque converter can be supplied to the servo chambers for the clutches and brake bands so as to provide a sufficiently large engaging force in the low speed range, while a constant low line pressure can be supplied to the servo chambers to prevent power losses including losses occurring in the oil pump and other elements in the high speed range since the torque multiplying action of the torque converter is lost in the high speed range due to the fact that the torque converter acts substantially as a hydraulic coupling.

According to the present invention, further, the shift valve means provided for the sake of shift control acts also as a means for varying the fluid pressure control action of the pressure regulator valve 105. This eliminates the need for provision of valve means (such as the so-called compensator valve or throttle relay valve) employed in the conventional automatic transmissions for varying the fluid pressure control action of the pressure regulator valve and remarkably simplifies the structure of the hydraulic circuit.

The fluid passage 134 leading from the 1 – 2 shift means 130 to the applying side 22a of the servo for the front brake band 22 is connected to the pressure reducing chamber 109 of the pressure regulator valve 105 so as to step-down the line pressure in simultaneous relation with a shift to the second speed gear. The fluid passage 139 leading from the 2 – 3 shift means 135 to the servo chamber 7a for the rear clutch 7 may be connected to the pressure reducing chamber 109 of the pressure regulator valve 105 so as to step-down the line pressure in simultaneous relation with a shift to the third speed gear. In FIG. 11, a stepdown in the line pressure from the constant fluid pressure $P_{LM}$ to the constant low fluid pressure $P_{LL}$ takes place in response to a fluid pressure signal applied from the 1 – 2 shift means 130 as soon as the speed ratio is changed from the first to second speed. This arrangement is also effective in that a line pressure control similar to that attained in simultaneous relation with the shift to the second speed gear can be carried out.

It will be understood that the 1 – 2 shift means 130 and the 2 – 3 shift means 135 are operated to vary the pressure regulating action of the pressure regulator valve 105 and to carry out the automatic shift operation, and this is accomplished by selectively energizing and deenergizing the solenoids 132 and 137. The shift signal control system for supplying current and interrupting the current supplied to the solenoids 132 and 137 will next be described.

SHIFT SIGNAL CONTROL SYSTEM

Figure 12:
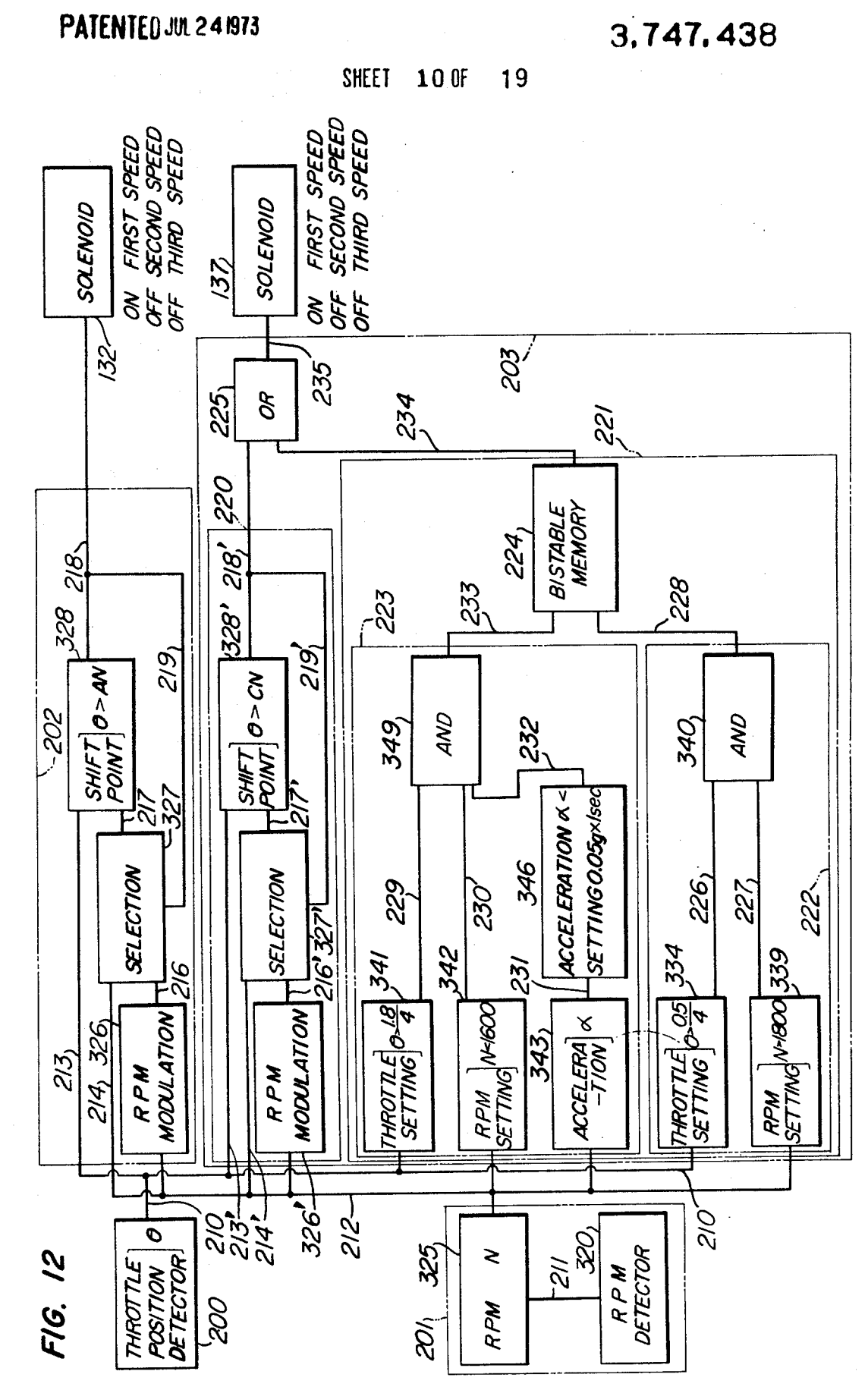

FIG. 12 is a block diagram of this electrically controlled system. The electrical power source 500 (FIG. 1) supplies unnecessary voltage to power input terminals (not shown) of circuits in the blocks. The electrical power source 500 comprises a battery mounted in the vehicle and a voltage regulator for regulating the voltage supplied from the battery so as to supply a constant voltage required for the operation of elements in the circuits. The shift signal control system comprises a throttle position detecting unit 200, an output shaft r.p.m. detecting unit 201, a 1 – 2 shift point computing circuit 202 and a 2 – 3 shift point computing circuit 203.

The throttle position detecting unit 200 shown in FIG. 7 includes a variable resistor 310 having a center tap operatively connected with an accelerator pedal 311 through a cam lever 312, so that an electrical signal ($\theta$) which is variable depending on the position of the accelerator pedal 311 is delivered by a lead 210. One end of the resistor 310 is connected to the power source 500 and the other end is grounded.

Figure 18:
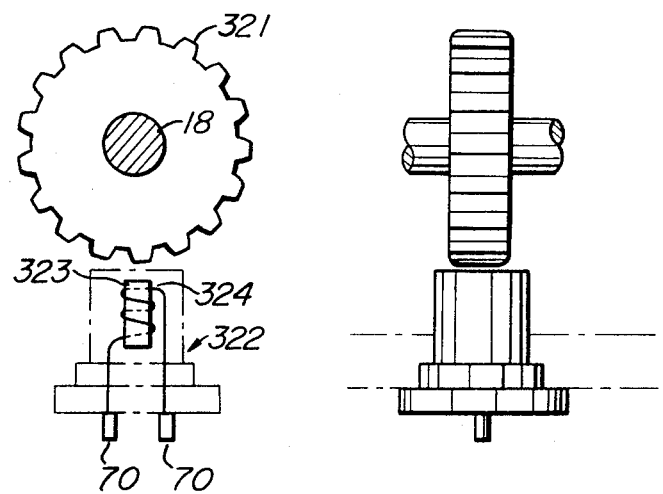
FIG. 18 is a schematic view showing the structure of an output shaft r.p.m. detecting means.
Figure 19:
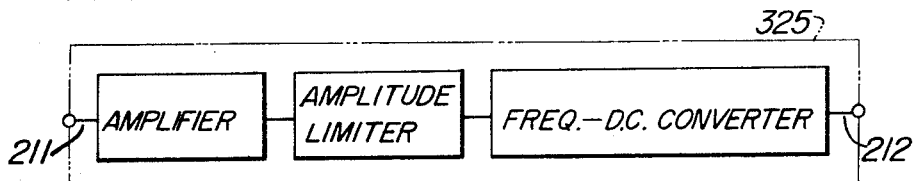
FIG. 19 is a block diagram showing the structure of an output shaft r.p.m. operating circuit.

The output shaft r.p.m. detecting unit 201 includes an output shaft r.p.m. detecting means 320 and an output shaft r.p.m. operating circuit 325. As shown in FIG. 18, the output shaft r.p.m. detecting means 320 is composed of a toothed disc 321 of a magnetic material which is securely mounted on the output shaft 18 and a tachometer 322 disposed closely adjacent to the toothed disc 321 in the diametral direction of the latter. The tachometer 322 includes a permanent magnet 323 and a coil 324 wound around the permanent magnet 323. The permanent magnet 323 and the coil 324 are housed in a suitable casing of a nonmagnetic material and the casing is mounted on the housing of the transmission so that one end of the permanent magnet 323 is disposed in close proximity to the outer periphery of the toothed disc 321. As the tooth portion of the toothed disc 321 passes through the magnetic field of the permanent magnet 323 with the rotation of the toothed disc 321, a variation takes place in the leakage flux of the permanent magnet 323 so that an electromotive force is produced in the coil 324. This electromotive force or voltage appears across terminals 70 to be applied to the output shaft r.p.m. operating circuit 325 shown in FIG. 19. The output shaft r.p.m. operating circuit 325 is composed of an amplifying circuit, an amplitude limiting circuit and a frequency — D.C. voltage conversion circuit. The input voltage signal applied through a lead 211 is amplified by the amplifying circuit, and the amplitude limiting circuit limits the amplitude of the amplified signal to a fixed value. The frequency — D.C. voltage conversion circuit converts the A.C. voltage into a D.C. voltage, which is then led out by a lead 212. The electrical signal (N) having its waveform thus stabilized and representing the r.p.m. of the output shaft 18 is applied to the shift point computing circuits together with the electrical signal ($\theta$) representing the throttle position.

The 1 – 2 shift point computing circuit 202 includes an output shaft r.p.m. modifying circuit 326, a selection circuit 327 and a shift point operating circuit 328. The electrical signal (N) representing the output shaft r.p.m. is applied to the selection circuit 327 through a lead 214. At the same time, this electrical signal (N) is applied to the output shaft r.p.m. modulation circuit 326 through the lead 212 so that the signal is applied in a suitably modulated form to the selection circuit 327 through a lead 216 the term "modulate" as used herein will hereinafter be referred to as amplifying or attenuating an electrical signal.

The output shaft r.p.m. modulating circuit 326 may be a potentiometer which is connected at one end to ground and at the other end to the output shaft r.p.m. detecting unit 201 to be applied with the electrical signal (N) therefrom. The slide arm of this potentiometer is connected to the selection circuit 327 by the lead 216. The selection circuit 327 may be a switching relay of double-throw double-pole type (not shown) which is provided with a movable contact and two fixed contacts. The movable contact is connected to an output lead 217, and the fixed contacts are connected to the respective input leads 214 and 216. The output lead 217 leading from the selection circuit 327 is selectively and electrically connectable with one of the input leads 214 and 216 by the switching relay. This switching relay is connected at one end to a feedback lead 219 connected to an output lead 218 leading from the shift point operating circuit 328 and is grounded at the other end. When an output voltage appears from the shift point operating circuit 328, the switching relay is energized thereby connecting the lead 216 with the lead 217, while when no output voltage appears from the circuit 328, the lead 214 is connected to the lead 217.

Figure 13:
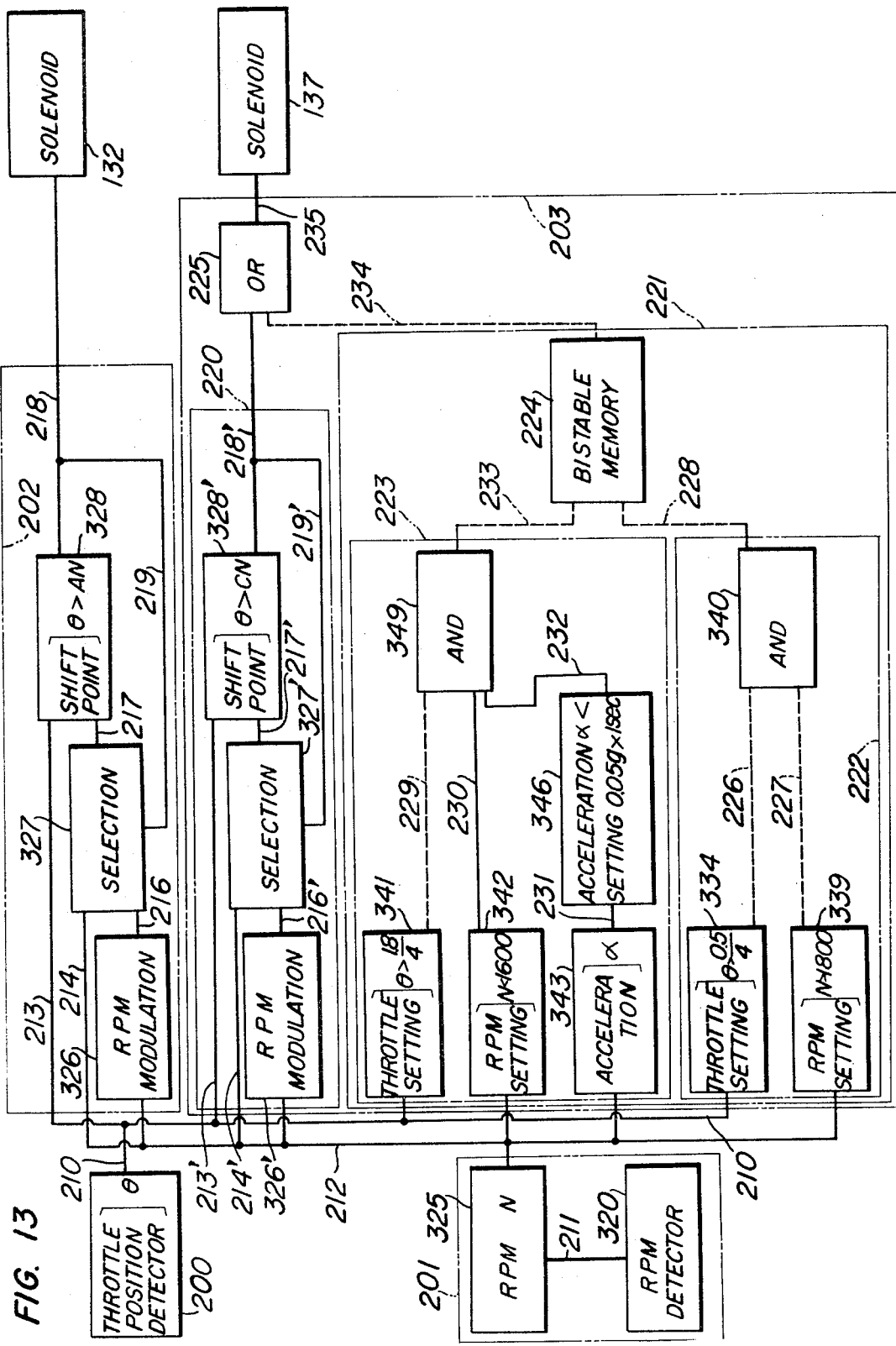
FIG. 13 is a block diagram similar to FIG. 12, but showing the system in its control operation for first speed.

The inclusion of selection circuit 327 provides hysteresis to the system such that an added resistance is included whenever selector 327 network is actuated by 328 so that modulation circuit 326 is coupled serially with the shift point circuit 328 through the selector 327 network. The hysteresis added in this manner is similar to that disclosed in the application referred to at the beginning of the specification, namely, Wakamatsu et al, Ser. No. 874,934. An ELECTRONIC CIRCUIT FOR ESTABLISHING SELECTION AND FEEDBACK is shown in FIGS. 8 and 13 of that application, and could be used herein. Further, the Wakamatsu U.S. Pat. No. 3,641,844 shows and describes the shift point operating circuit 328 in FIG. 11a and in further detail in FIG. 11b. The description therein provides additional explanation as to specific components which could be used to provide such functions as are described below.

Figure 20:
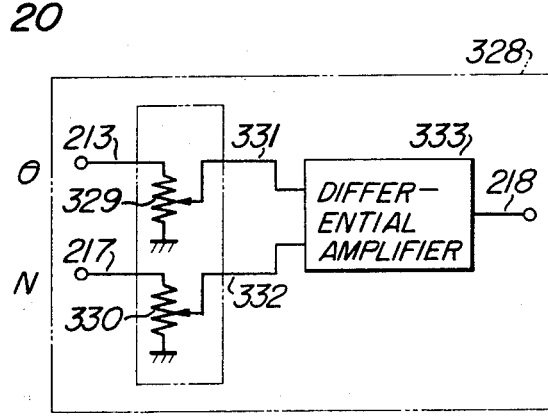
FIG. 20 is a block diagram showing the structure of a shift point operating circuit.

The shift point operating circuit 328 has a structure as shown in FIG. 20. The lead 217 for feeding the signal (N) representing the output shaft r.p.m. and the lead 213 for feeding the signal ($\theta$) representing the throttle position are connected to one end of potentiometers 330 and 329, respectively. The potentiometers 329 and 330 are grounded at the other end thereof. Slide arms 331 and 332 for the respective potentiometers 329 and 330 are connected to a differential amplifier 333 whose output signal appears on the lead 218. The differential amplifier 333 is a means which compares two inputs with each other and produces an output when there is a difference between these two inputs. The differential amplifier 333 may be an integrated circuit type SN72710 sold by Texas Instruments Incorporated. The computation of the shift point means the computation of ($\theta$) − A(N)>0 where A is a constant determined from a shift diagram shown in FIG. 25. At first, the positions of the slide arms 331 and 332 are so determined that the output voltages appearing in response to the application of the signals ($\theta$) and (N) to the potentiometers 329 and 330 give the relation ($\theta$) = A(N). When these two output voltages are applied to the differential amplifier 333, the difference therebetween, that is ($\theta$) − A(N) is computed. When the result is positive, the difference is amplified to appear as a fixed voltage on the lead 218, while when the result is negative, no output voltage appears on the lead 218. Thus, the computation of ($\theta$)>A(N) can be carried out by suitably selecting the settings of the potentiometers as well as the input terminals of the potentiometers. The output signal from the operating circuit 328 appears as a voltage on the lead 218 to energize the 1 – 2 shift solenoid 132.

The 2 – 3 shift point computing circuit 203 includes a first shift point computing circuit 220 and a second shift point computing circuit 221. The first shift point computing circuit 220 is similar to the 1 – 2 shift point computing circuit 202 in structure and is composed of an output shaft r.p.m. modifying circuit 326', a selection circuit 327' and a shift point operating circuit 328'. The relation (θ)>C(N) is computed in the shift point operating circuit 328' whose output appears on a lead 218'. The second shift point computing circuit 221 is composed of a shift point operating circuit 222, a gradient setting operating circuit 223 and a bistable memory circuit 224. In more detail, the second shift point operating circuit 222 is composed of a throttle position setting operating circuit 334, an output shaft r.p.m. setting operating circuit 339 and an AND circuit 340.

Figure 21A:
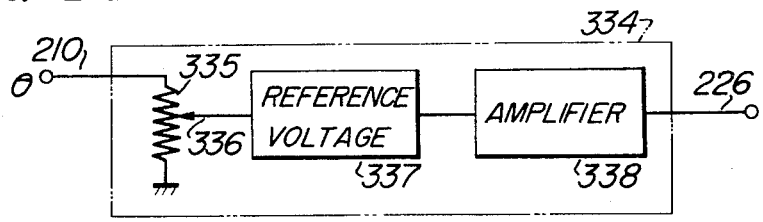
FIG. 21a is a block diagram showing the structure of a setting operating circuit.
Figure 21B:
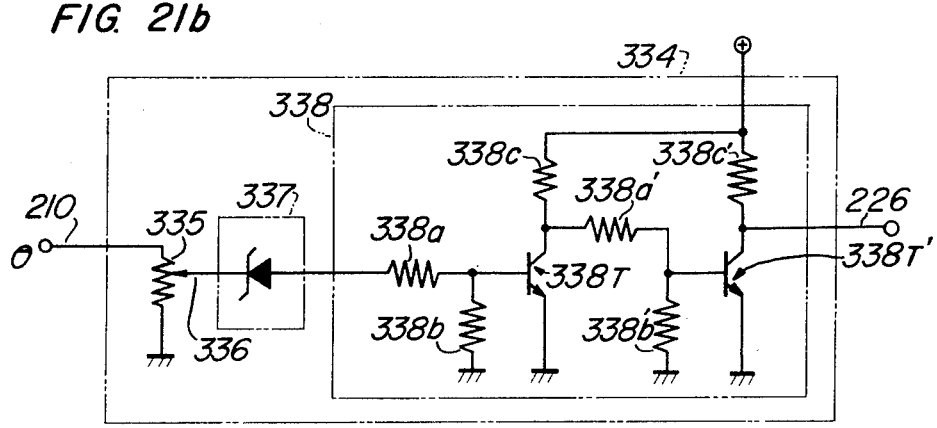
FIG. 21b is a connection diagram of the setting operating circuit.

In regard to the setting operating circuits 334 and 339, these circuits are operative to determine whether an output signal is to be delivered or not depending on the magnitude of the input voltages (θ) and (N) relative to predetermined values. By way of example, one form of the throttle position setting operating circuit 334 adapted for the computation of θ>(0.5/4) is shown in FIG. 21a. The voltage representing the throttle position or opening θ is applied via the lead 210 to a potentiometer 335 whose slide arm 336 is connected to a reference voltage means 337. The reference voltage means 337 may be a Zener diode as shown in FIG. 21b. Therefore, it conducts when a voltage higher than the reference voltage (Zener voltage) is applied thereto. The output of the reference voltage means 337 is connected to an amplifying circuit 338 whose output appears on a lead 226. The slide arm 336 is set at a suitable position to suitably divide the voltage (θ) applied to the potentiometer 335. When the voltage at the slide arm 336 becomes higher than the reference voltage corresponding to θ = 0.5/4, the reference voltage means 337 supplies a signal to the amplifying circuit 338 and an amplified voltage is produced by the amplifying circuit 338. The amplifying circuit 338 may be a known twostage transistor amplifier as shown in FIG. 21b. This amplifier includes a first grounded-emitter NPN transistor 338T whose base is connected to the output of the reference voltage means 337 through an input resistor 338a and a second grounded-emitter NPN transistor 338T' whose base is connected to the collector of the first transistor 338T through an input resistor 338a'. The second transistor 338T' is connected at its collector to the output lead 226. When, conversely, the reference voltage is higher than the voltage at the slide arm 336, no voltage appears at the output of the reference voltage means 337. The output shaft r.p.m. setting operating circuit 339 has a structure exactly the same as the throttle position setting operating circuit 334 and the signal (N) instead of the signal (θ) may be applied to the lead 210 shown in FIG. 21a. The shift point operating circuit 222 thus includes the two setting operating circuits 334 and 339 described above so that the signal (θ) representing the throttle position is applied through the lead 210 to the setting operating circuit 334 and an output from the circuit 334 is applied through the lead 226 to the AND circuit 340. On the other hand, the signal (N) representing the output shaft r.p.m. is applied through the lead 212 to the setting operating circuit 339 and an output from the circuit 339 is applied through a lead 227 to the AND circuit 340.

Figure 27:
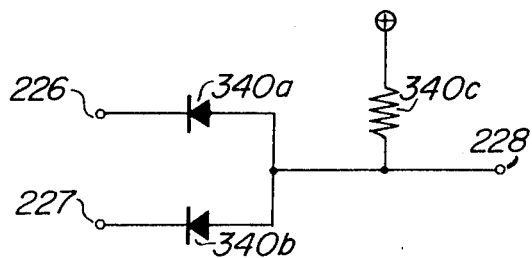
FIG. 27 is a connection diagram showing the structure of an AND circuit.

As shown in FIG. 27, the AND circuit 340 is in the form of diode logic comprising two diodes 340a and 340b connected at their anode to a positive voltage supply through a common resistor 340c. In this AND circuit 340a, a positive voltage appears on an output lead 228 when positive voltages are simultaneously applied by way of the input leads 226 and 227. (Refer to pages 373–381 of a known publication (I) entitled "Semiconductor Devices and Applications" written by R. A. Greiner and published by McGraw-Hill Book Company, Inc. in 1961.) Thus, when the output signal of θ>0.5/4 from the throttle position setting operating circuit 334 and the output signal of N>1,800 r.p.m. from the output shaft r.p.m. setting operating circuit 339 exist simultaneously, an output voltage signal appears on the lead 228. This signal is utilized as an upshift signal for causing a shift from the second to the third speed.

The gradient setting operating circuit 223 includes a throttle position setting operating circuit 341, an output shaft r.p.m. setting operating circuit 342, an acceleration operating circuit 343, an acceleration setting operating circuit 346 and an AND circuit 349.

Figure 22A:
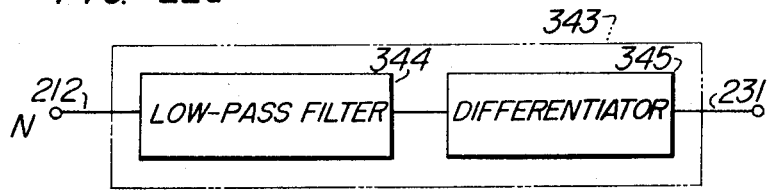
FIG. 22a is a block diagram showing the structure of an acceleration operating circuit.
Figure 22B:
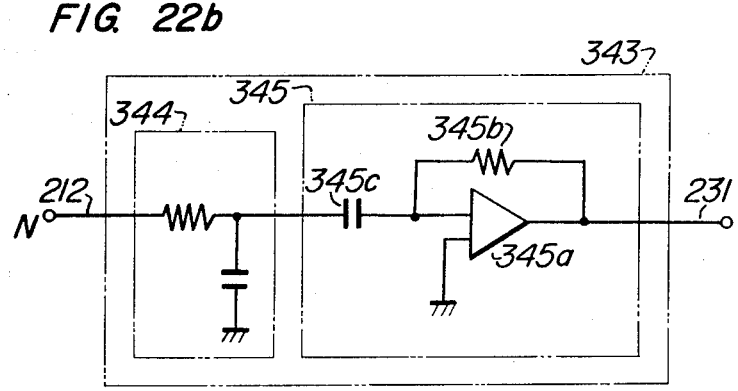
FIG. 22b is a connection diagram of the acceleration operating circuit.
Figure 23A:
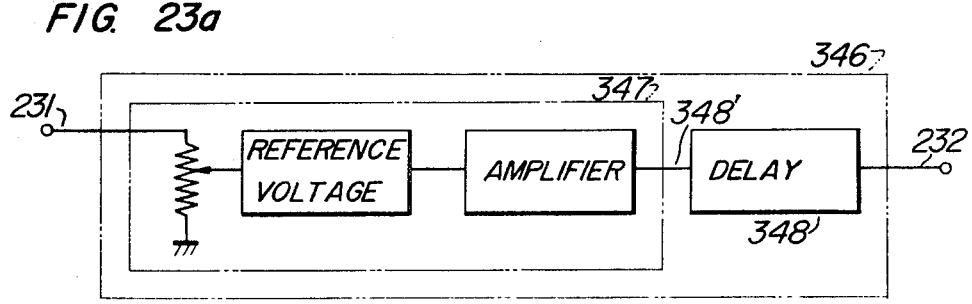
FIG. 23a is a block diagram showing the structure of an acceleration setting operating circuit.
Figure 23B:
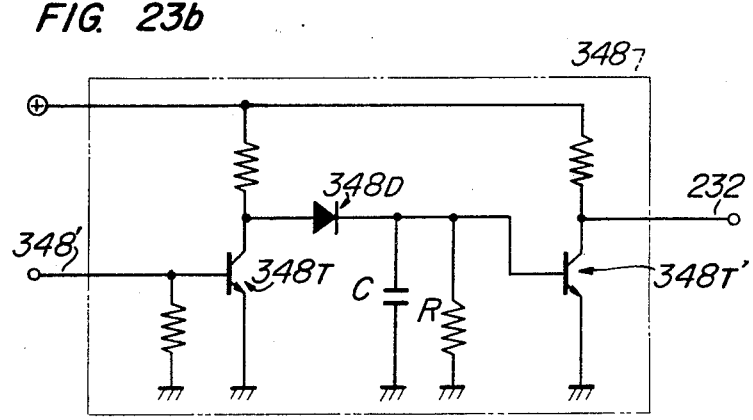
FIG. 23b is a connection diagram of the acceleration setting operating circuit.

The throttle position setting operating circuit 341 has a structure similar to the operating circuit 334 described in detail hereinbefore so that an output voltage appears on a lead 229 when the signal (θ) representing the throttle position satisfies the condition θ>1.8/4. The output shaft r.p.m. setting oerating circuit 342 is similar in structure to the operating circuit 339 except that an INVERTER circuit is included in an amplifying circuit disposed after a reference voltage means. The INVERTER circuit, that is, NOT circuit may be any suitable one well known in the art. For example, this circuit may be the amplifier portion including one of the two NPN transistors in two-stage transistor amplifier 338 shown in FIG. 21b so that, in response to the application of an input signal to the base of the transistor, an inverted output signal appears at the collector of the transistor. This inverted output signal appears on a lead 230 when the signal (N) representing the output shaft r.p.m. satisfies the condition N<1,600 r.p.m. (Refer to pages 373–381 of the publication (I) cited above.) However, negative logic using PNP transistors is described in this publication (I). The acceleration operating circuit 343 is composed of a lowpass filter circuit 344 and a differentiation circuit 345 as shown in FIG. 22a. The low-pass filter circuit 344 has a structure as shown in FIG. 22b and its input terminal is connected to the lead 212 to be applied with the signal (N) from the output shaft r.p.m. detecting unit 201. This circuit 344 is an RC circuit of known construction and acts to remove high frequency components utilizing the frequency characteristics of the RC combination. (Refer to pages 40–46 of a known publication (II) entitled "Pulse and Digital Circuits" written by J. Millman and H. Taub and published by McGraw-Hill Book Company, Inc. in 1956.) The differentiation circuit 345 has a structure as shown in FIG. 22b and is composed of an operational amplifier 345a, a resistor 345b and a capacitor 345c. The operational amplifier 345a may conveniently be an integrated circuit type SN52709 sold by Texas Instruments Incorporated. (Refer to pages 22–25 of the publication (II) above described.) The signal (N) applied to the filter circuit 344 through the lead 212 is corrected in its waveform by the filter circuit 344, which absorbs high frequency components of the signal, and is then differentiated in the differentiation circuit 345 which carries out the computation of $[d(N)/d\ t]$ to seek the acceleration $\alpha$ of the vehicle. The signal representing the acceleration $\alpha$ is applied through a lead 231 to the acceleration setting operating circuit 346. As shown in FIG. 23a, the acceleration setting operating circuit 346 is composed of a setting operating circuit 347 and a delay circuit 348. The setting operating circuit 347 is composed of a potentiometer, a reference voltage means and an amplifying circuit and is thus similar in structure to those described hereinbefore. The amplifying circuit in the setting operating circuit 347 includes therein an INVERTER circuit similar to that provided in the output shaft r.p.m. setting operating circuit 342. An output signal is supplied from the operating circuit 347 to the delay circuit 348 when the condition $\alpha<0.05$ g (g is the acceleration due to gravity) is satisfied. The delay circuit 348 has a structure as shown in FIG. 23b. When no voltage input is applied by way of an input lead 348', a first transistor 348T is in the cut-off state and a capacitor C is charged through a diode 348D. In this state, the base potential at a second transistor 348T' is positive and the second transistor 348T' is conducting. Thus, no voltage output appears on an output lead 232. On the other hand, when a positive voltage input is applied by way of the input lead 348', the first transistor 348T conducts and the collector potential at this transistor 348T is reduced. However, due to the presence of the diode 348D, the charge stored in the capacitor C is gradually discharged through a resistor R so that the second transistor 348T' is not cut off immediately. Complete discharge of the charge in the capacitor C through the resistor R results in the reduction of base potential at the second transistor 348T' thereby cutting off this transistor 348T' and a positive voltage output appears on the output lead 232. The period of time ranging from the application of a positive voltage input by way of the input lead 348' to the appearance of a positive voltage output on the output lead 232 can be varied by suitably selecting the capacitance of the capacitor C and the resistance of the resistor R. (Refer to pages 238-241 of a known publication (III) entitled "Design Manual for Transistor Circuits" written by J. M. Carroll and published by McGraw-Hill Book Company, Inc. in 1961.) the delay circuit 348 receiving the output signal from the setting operating circuit 347 delivers an output voltage to the lead 232 only when the signal persists for more than 1 second. Thus, the combination of the setting operating circuit 347 and the delay circuit 348 is so operative that an output signal appears on the lead 232 only when the state of $\alpha<0.05$ g persists for at least 1 second.

An output voltage is delivered from the AND circuit 349 to appear on a lead 233 when the signal of $\theta>1.8/4$ from the throttle position setting operating circuit 341, the signal of $N<1,600$ r.p.m. from the output shaft r.p.m. setting operating circuit 342 and the signal delivered from the acceleration setting operating circuit 346 in response to the persistence of the state of $\alpha<0.05$ g for at least 1 second exist simultaneously. This output voltage signal is utilized as a downshift signal for causing a shift from third gear to second and as a signal for shifting the 2 - 3 upshift point (line) to the high speed side.

The output signal from the gradient setting operating circuit 223 and the output signal from the shift point operating circuit 222 are applied through the respective leads 233 and 228 to the bistable memory circuit 224.

Figure 24A:
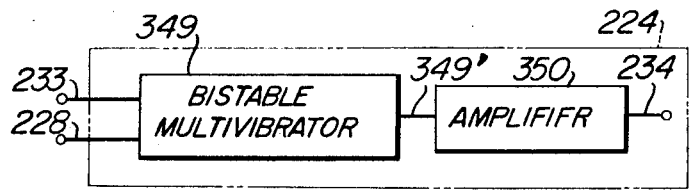
FIG. 24a is a block diagram showing the structure of a bistable memory circuit.
Figure 24B:
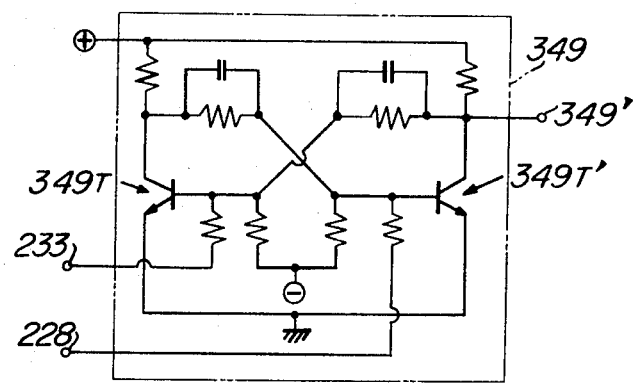
FIG. 24b is a connection diagram of the bistable memory circuit.

The bistable memory circuit 224 has a structure as shown in FIG. 24a. The leads 228 and 233 are connected to input terminals of a bistable multivibrator 349. The bistable multivibrator 349 is also called a flip-flop circuit and one form of such circuit is shown in FIG. 24b. This circuit includes two NPN transistors 349T and 349T'. Each transistor is grounded at the emitter and is connected at the collector to a positive voltage supply through a resistor, while the base is connected to a negative voltage supply through another resistor. Further, these transistors are each connected at their base to the collector of the other transistor through a resistor, and one of the transistors is conducting when the other is cut off. More precisely, in response to the application of a positive voltage input by way of the lead 233, the first transistor 349T conducts while the second transistor 349T' is cut off, and a positive voltage output appears on an output lead 349'. On the other hand, in response to the application of a positive voltage input by way of the lead 228, the second transistor 349T' conducts now and no output voltage appears on the output lead 349'. This output lead 349' is connected to the amplifying circuit 350 as shown in FIG. 24a. The amplifying circuit 350 has a structure similar to the amplifying circuit 338. Thus, when a signal voltage appears on the lead 233, for example, the bistable multivibrator 349 is immediately placed in one of the stable states and its output is amplified by an amplifying circuit 350 to appear on a lead 234. (Refer to pages 386-392 of the previously cited publication (I) entitled "Semiconductor Devices and Applications.") On the other hand, when an input signal is applied through the lead 228, the biastable multivibrator 349 is placed in the other stable state and its output is amplified by the amplifier, but no output voltage appears from the amplifier 350. Even when the input signal is applied through the lead 233, for example, and then disappears, the bistable multivibrator 349 maintains its stable state to continuously deliver its output via the lead 234.

The output of the second shift point operating circuit 221 described in detail above and the output of the first shift point operating circuit 220 are connected to an OR circuit 225 which will be described below so as to control the 2 - 3 shift solenoid 137 depending on the output signals from these circuits.

Figure 28:
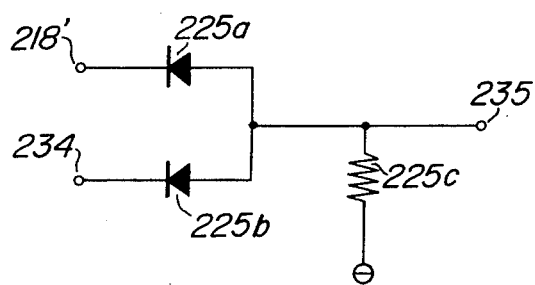
FIG. 28 is a connection diagram showing the structure of an OR circuit.

Actually, the OR circuit 225, which is provided for obtaining the logic sum, is in the form of diode logic in which two diodes 225a and 225b are connected at their cathode to a negative voltage supply through a common resistor 225c as shown in FIG. 28. A positive voltage output is delivered from this circuit to appear on an output lead 235 when a positive voltage input is applied by way of anyone of the input leads 218' and 234. The output signal from the shift point operating circuit 328' and the output signal from the bistable memory circuit 224 are applied to the OR circuit 225 through the respective leads 218' and 234. When any one of these two signals exists, an output signal appears on the lead 235 to be supplied to the solenoid 137.

The shift control operation of the component circuits of the shift signal control system will be described in detail below.

SHIFT CONTROL OPERATION

The relation between the speed ratio of the transmission and the operating state of the solenoids has been described in the description relating to the hydraulic actuating circuit, and this can be summarized as shown in the following table:

TABLE 1

|  | Solenoid 132 | Solenoid 137 |
|---|---|---|
| First gear | Energized | Energized |
| Second gear | De-energized | Energized |
| Third gear | De-energized | De-energized |

(1) 1 – 2 Shift Control

Figure 25:
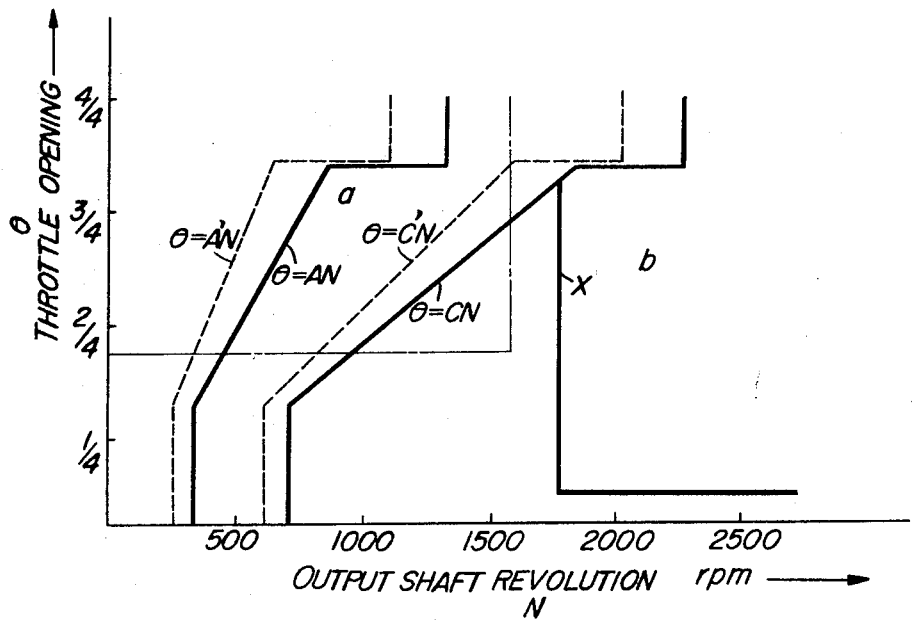
FIG. 25 is a graph showing one example of the shift regions.

The magnitude of the throttle position signal ($\theta$) becomes smaller than A(N) or ($\theta$)<A(N) when the running conditions of the vehicles make a shift to the region (where the output shaft r.p.m. is higher) on the right-hand side of the curve $\theta = AN$ in the shift diagram shown in FIG. 25. Thus, the output signal from the shift point operating circuit 328 is cut off and the solenoid 132 is de-energized with the result that a shift from first to second gear takes place. At the same time, the feedback circuit 219 connecting the lead 218 with the selection circuit 327 is rendered inoperative since no output appears on the lead 218 from the shift point operating circuit 328. As a result, the leads 214 and 217 are now electrically connected to the selection circuit 327 in lieu of the previous connection in which the leads 216 and 217 had been electrically connected with the selection circuit 327 in the first gear position. The signal (N) had been modulated by the output shaft r.p.m. modifying circuit 326 in the first gear, but the signal (N) is directly applied to the shift point operating circuit 328 when the gear has been changed to the second gear. Thus, the relation between ($\theta$) and (N) is now represented by $\theta = A'N$ shown in FIG. 25, and a 2 – 1 shift occurs on this curve. This curve represents a 2 – 1 downshift line. That is to say, the voltage signal (N) representing the output shaft r.p.m. is variable depending on first and second gear positions and such a variable signal is applied to the shift point operating circuit so as to provide hysteresis between the 1 – 2 upshift point and the 2 – 1 downshift point thereby to ensure a stable shift operation. By virtue of such a circuitry, the computation for the upshift and downshift can be carried out by the same shift point operating circuit.

Figure 14:
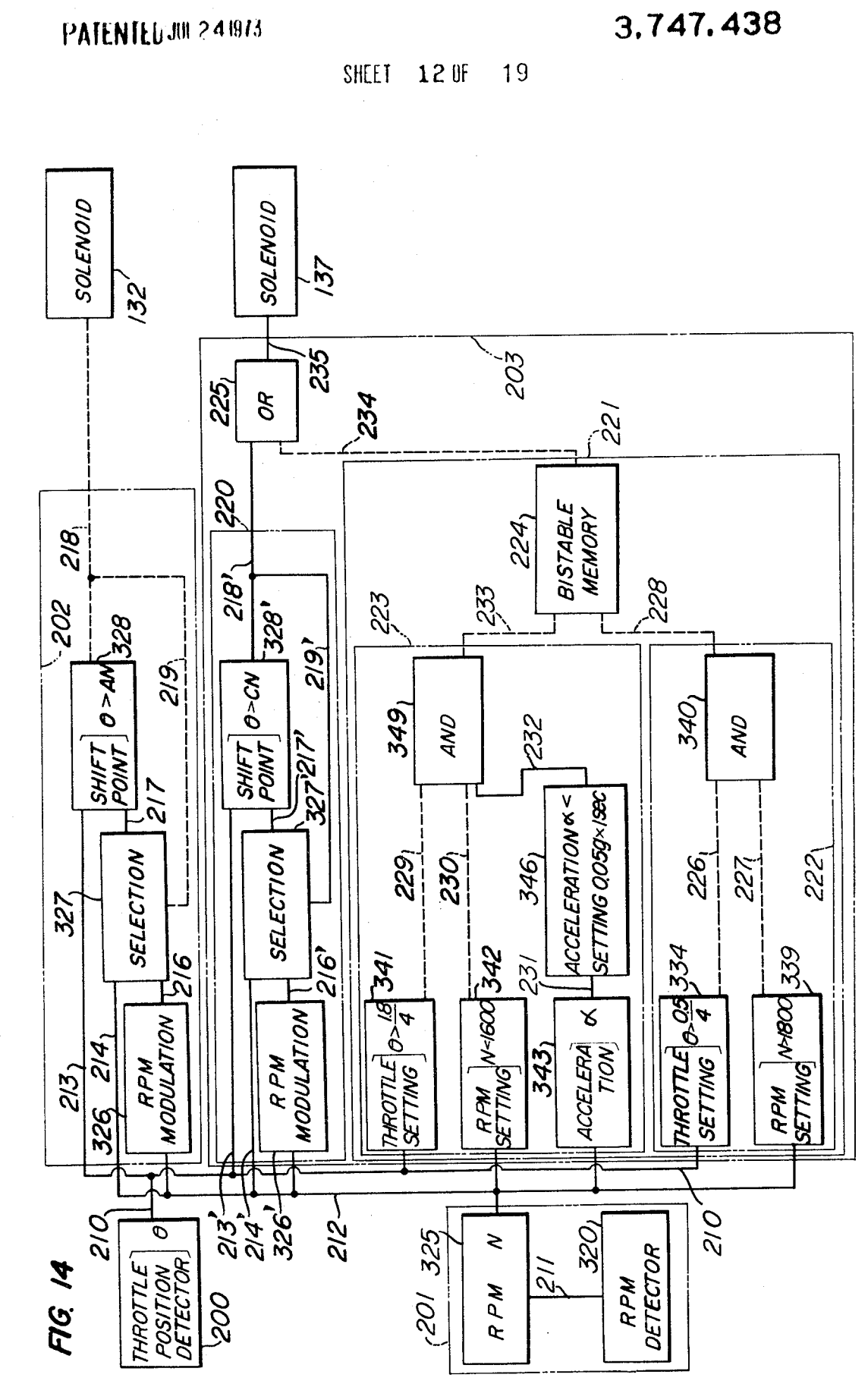

Such a 1 – 2 shift control operation will be apparent from the comparison between the control circuit in the first gear position shown in FIG. 13 and the control circuit in the second gear position shown in FIG. 14. In FIGS. 13 and 14, those lines on which no signal voltage appears are shown by the broken lines and those lines on which a signal voltage appears are shown by the solid lines.

(2) 2 – 3 Shift Control

Figure 15:
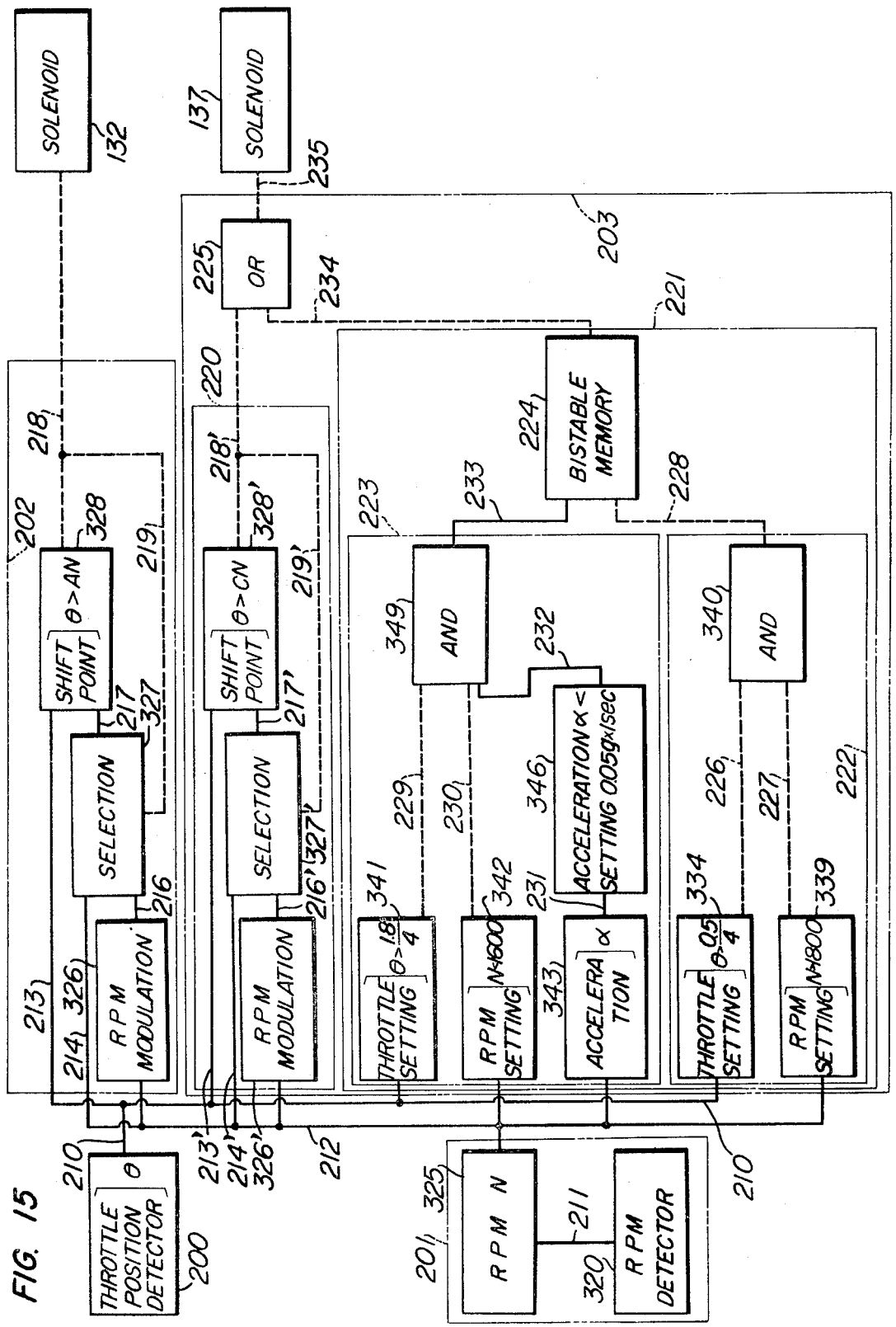
FIG. 15 is a block diagram similar to FIG. 12, but showing the system in its control operation for third speed.
Figure 17:
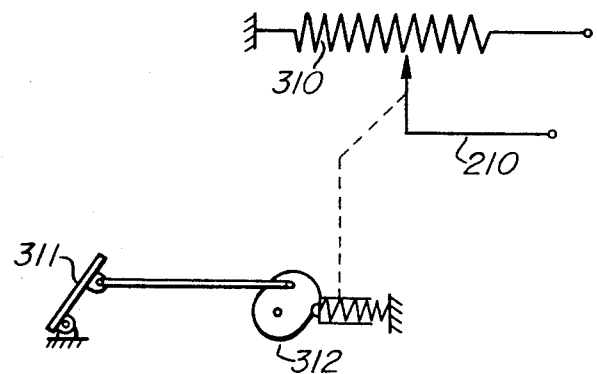
FIG. 17 is a schematic view showing the structure of a throttle position detecting means.

Firstly, the shift control operation by the first shift point computing circuit 220 is carried out in a manner as described below. When the vehicle speed is increased to such an extent that the conditions of the vehicle make a shift to the region on the right-hand side of the curve $\theta = CN$ in the shift diagram shown in FIG. 25, the output signal from the shift point operating circuit 328' is cut off, and in the case of the absence of any signal voltage on the output lead 234 of the second shift point computing circuit 221, the solenoid 137 is de-energized so that a shift from second to third gear occurs. This state is shown in FIG. 15. At this time, no output is delivered from the shift point computing circuit 328' and no signal is supplied to the feedback circuit 219' connected to the output lead 218'. As a result, the leads 214' and 217' are now connected with the selection circuit 327' in place of the previous connection in second gear including the leads 216' and 217'. The signal (N) had been modulated by the output shaft r.p.m. modifying circuit 326' in the second gear, but in the third gear, this signal (N) is directly applied to the shift point operating circuit 328'. Consequently, when a gear has been changed to third gear, the shift point makes a transition to the curve $\theta = C'N$ in FIG. 25 in spite of the fact that the computation is carried out by the same shift point operating circuit 328'. That is to say, there is a hysteresis between the 2 – 3 upshift line ($\theta = CN$) and the 3 – 2 downshift line ($\theta = C'N$). It will be seen from the above description that the shift control operation of the first shift point computing circuit 220 is the same as that of the 1 – 2 shift control operation.

Secondly, the shift control operation of the second shift point computing circuit 221 includes the 2 – 3 shift control operation by the gradient operating circuit 223, the shift point operating circuit 222 and the bistable memory circuit 224.

Figure 16:
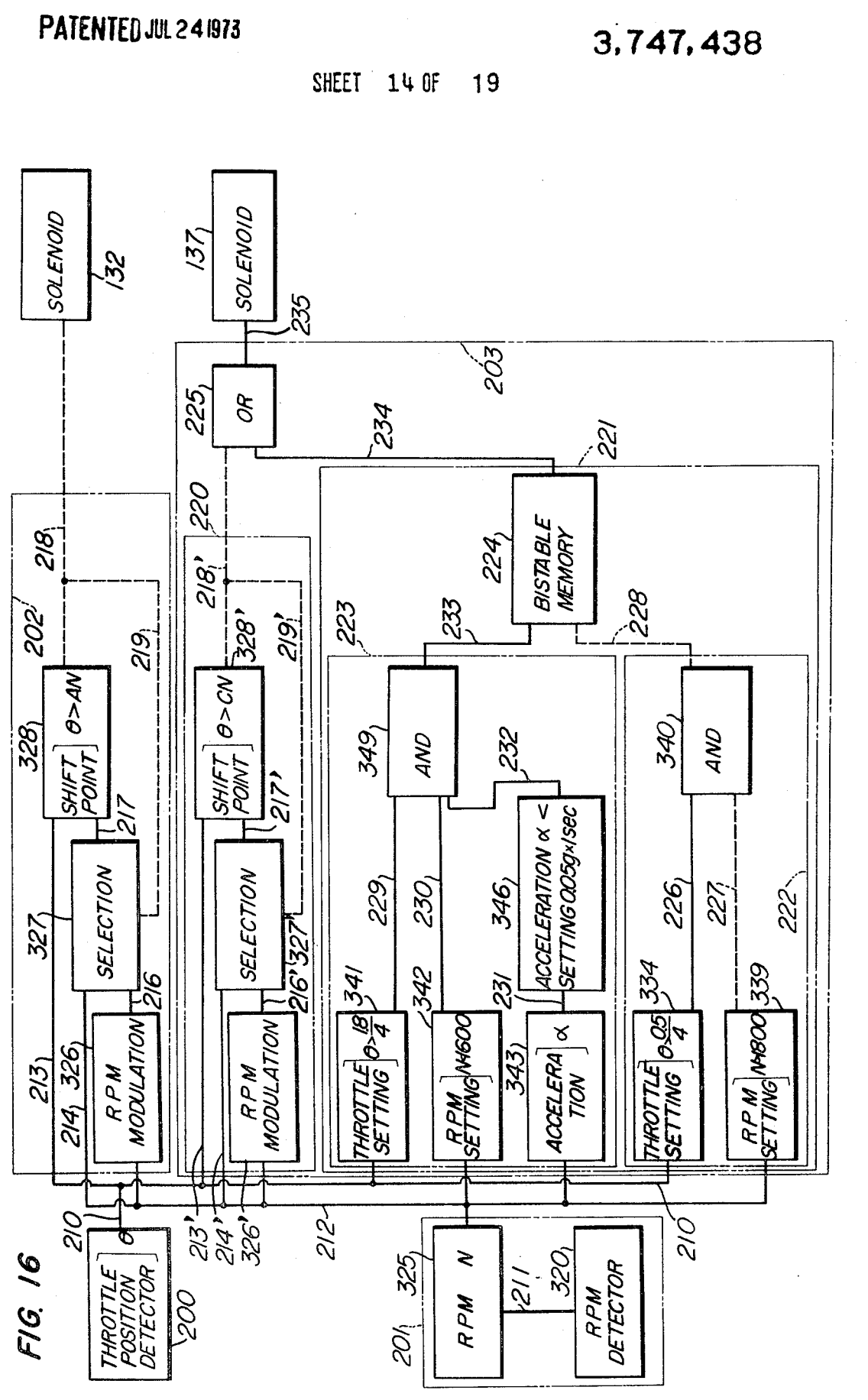

When the running conditions of the vehicle make a shift to the region a (where $\theta > 1.8/4$ and N < 1,600 r.p.m.) in FIG. 25 and yet the conditions are set for the acceleration setting operating circuit 346, that is, the condition that the acceleration $\alpha < 0.05$ g persists for at least 1 second is satisfied, an output signal is delivered from the AND circuit 349 and then a signal is delivered from the bistable memory circuit 224. As a result, a signal is delivered from the OR circuit 225 to appear on the lead 235 to energize the solenoid 137. (When the vehicle is running in third gear at the time of the appearance of this signal, a downshift to second gear takes place, if however the vehicle is running in another gear, no change will occur in the gear ratio.) FIG. 16 shows the state after a downshift to second gear from third gear. Since this electrical signal is supplied to the solenoid 137 through the bistable memory circuit 224, the memory circuit 224 acts to continuously energize the solenoid 137 even when the output signal from the AND circuit 349 disappears. This electrical signal disappears when the signal from the shift point operating circuit 222 is applied to the bistable memory circuit 224, that is, when both the conditions $\theta > 0.5/4$ and N>1,800 r.p.m. are satisfied and the respective signals are delivered from the throttle position setting operating circuit 334 and the output shaft r.p.m. setting operating circuit 339, with the result that an output is delivered from the AND circuit 340 to be applied to the bistable memory circuit 224. The bistable memory circuit 224 is kept in the other stable state even when the signal from the shift point operating circuit 222 disappears. Thus, when the running conditions of the vehicle make a shift to the region b in FIG. 25 (where $\theta > 0.5/4$ and N>1,800 r.p.m.), the signal from the gradient operating circuit 223 is cut off and an upshift to third gear takes place in the absence of any signal from the first shift point computing circuit 220.

Figure 26:
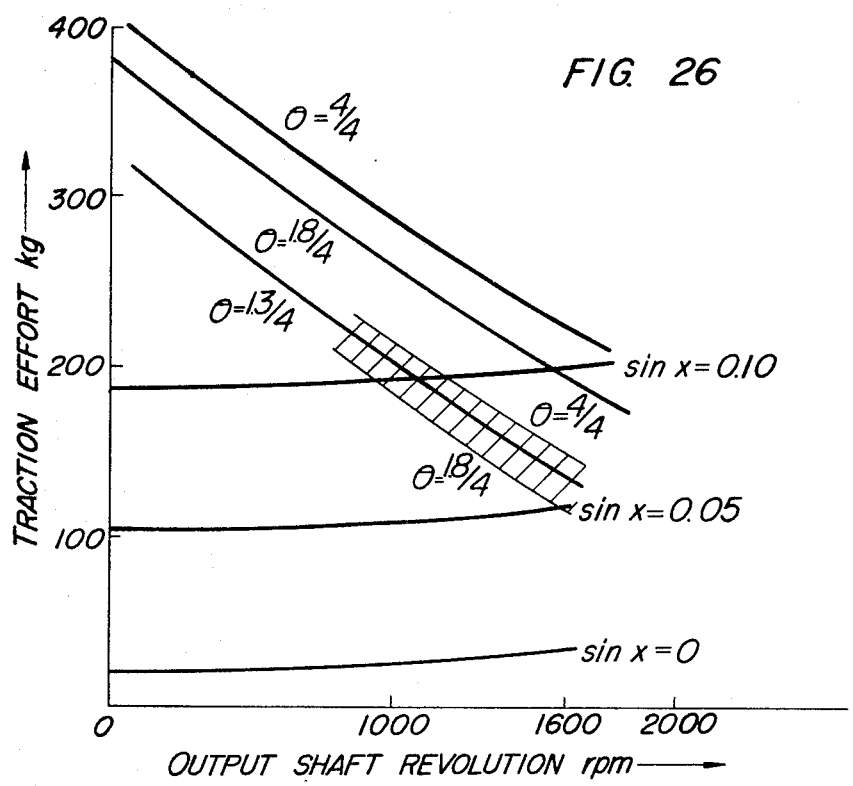
FIG. 26 is a graph showing a drive performance for the illustration of the manner of operation of a gradient operating circuit.

FIG. 26 is a graph showing the characteristic running performance of an automotive vehicle equipped with a torque converter transmission. The total running resistance R in the case in which the vehicle runs at a uniform speed is given by the sum of the rolling resistance, air resistance and resistance due to an incline. The relation between the output shaft r.p.m. N and the tractive effort is shown in FIG. 26 by taking the gradient sin $x$ as a parameter. As will be seen from FIG. 26, the total running resistance R increases as the gradient sin $x$ increases. On the other hand, the driving force H transmitted from the engine is determined by the engine's performance and the transmission performance. In FIG. 26, the relation between the output shaft r.p.m. N and the tractive effort in third gear is also shown by taking the throttle position $\theta$ as a parameter. The difference between the driving force H of the engine and the total running resistance R represents the acceleration resistance Rh encountered in accelerating the vehicle. The acceleration resistance Rh is generally given by the following equation:

$$Rh = [(W + We)/g] \alpha Kg \qquad (1)$$

where W is the weight of the vehicle in Kg. We is the weight corresponding to the inertia of the rotating parts of the driving mechanism of the vehicle in Kg, $\alpha$ is the acceleration of the vehicle in m/sec$^2$, and g is the acceleration due to gravity in m/sec$^2$. Thus, the acceleration resistance Rh can be obtained from the above equation when the value of the acceleration $\alpha$, principal particulars of the vehicle, road conditions and other factors are given. Since the acceleration resistance Rh = H − R, Rh is substantially a function of the throttle position $\theta$, output shaft r.p.m. N and gradient sin x. That is, Rh is expressed as Rh = F ($\theta$, N, sin x). It will thus be apparent that the gradient sin x can be computed when the throttle position $\theta$, the output shaft r.p.m. N and the acceleration $\alpha$ (from which Rh can be computed from the above equation, which is obtained by differentiating the output shaft r.p.m. N) are detected in the manner described in the embodiment of the present invention.

The present invention utilizes the above relation in its simplest form so that the gradient which decreases with an increase in the output shaft r.p.m. is detected by the gradient operating circuit 223. Under the conditions of the throttle opening of $\theta > 1.8/4$, the output shaft r.p.m. of N<1,600 r.p.m. and the acceleration of the vehicle of $\alpha$ 0.05 g in third gear, the gradient operating circuit 223 detects a progressively low gradient with an increase in the output shaft r.p.m. N as shown in FIG. 26. Thus, the gradient operating circuit 223 detects a gradient of sin x ≥ 0.05 in the vicinity of the output shaft r.p.m. of N = 1,600 r.p.m. and a gradient of sin x ≥ 0.10 in the vicinity of the output shaft r.p.m. of N = 1,000 r.p.m. The hatched portion in FIG. 26 shows a gradient in the region of $\theta \geq 1.8/4$ and N ≤ 1,600 r.p.m. in third gear when the acceleration $\alpha$ is $\alpha = 0.05$ g. Such a gradient is detected when the vehicle runs on an ascending slope or is in a mountainous area and a signal responsive thereto is utilized as a shift signal to cause a shift to a lower gear or as a signal to transpose the shift line towards a high speed side, so that the vehicle can run with the most appropriate gear position. It is the acceleration $\alpha$ that determines the gradient sin x, and while it is set at a fixed value corresponding to the settings of the throttle position and the output shaft r.p.m. in the embodiment described above, it may be a variable which varies depending on the throttle position and the output shaft r.p.m. where a further higher degree of control is required. (This is made possible by letting the setting of the potentiometer or of the reference voltage means in the setting operating circuit 347 shown in FIG. 23 vary depending on the throttle position and vehicle speed.) When the vehicle is running in second gear, the driving force H of the engine is larger than that in third gear due to the characteristic performance of the transmission and a steeper gradient is detected.

As previously described, the 2 − 3 shift control operation is carried out by the two shift point computing circuits 220 and 221 whose output leads 218' and 234 are connected to the solenoid 137 through the OR circuit 225. The relation between the gear position and the signals appearing on the leads 218' and 234 is shown in the following table:

TABLE 2

| Gear position | Signal on lead 218' | Signal on lead 234 |
|---|---|---|
| Second speed | On | On |
| Second speed | Off | On |
| Second speed | On | Off |
| Third speed | Off | Off |

When no signal appears on the lead 234, that is, when the vehicle runs on a level road and the accelerating force for the vehicle has a sufficient margin for the present throttle position $\theta$ and the output shaft r.p.m. N, the 2 − 3 shift occurs on the lines $\theta$ = CN and $\theta$ = C'N in FIG. 25. This shift pattern is the same as that has heretofore been employed in conventional automatic transmissions. However, when the vehicle starts to run up an incline and the margin of the accelerating force for the vehicle is lost, the signal appearing on the lead 234 causes a downshift to second gear from third gear if the vehicle has been running in third gear. No shift takes place in other cases. Thus, the thick solid line x in FIG. 25 which extends from the line $\theta$ = CN to the point $\theta$ = 0.5/4 at N = 1,800 r.p.m. represents the 2 − 3 upshift line. When the driving conditions of the vehicle make a shift to the region on the right-hand side of the 2 − 3 upshift line, a 2 − 3 upshift occurs and the signals on the leads 218' and 234 disappear under such circumstances. A 3 − 2 downshift can take place when the driving conditions of the vehicle make a shift to the region on the left-hand side of the line $\theta$ = C'N or when an output is delivered from the gradient operating circuit.

It will be understood from the foregoing description that the automatic shift control system according to the present invention is featured by the fact that a 2 − 3 shift (a shift between low gear and high gear in the case of a two forward speed automatic transmission) is carried out on two shift lines $\theta$ = CN and $\theta$ = CN' in FIG. 25 for running on a level road and on another shift line for running in a mountainous area. It is ideal for driving on a level road such as when running in an urban area or on a highway that the shift is carried out in a low speed range using only a small depression of the accelerator pedal, so that the shift point moves progressively towards a high speed side as the degree of accelerator pedal depression is increased.

Suppose that the vehicle running in a relatively low speed range of the third gear of this shift pattern enters a mountainous area and starts to run up an incline. Since, in such a state, the running resistance is increased due to the slope and the accelerating force is decreased, the accelerator pedal must be depressed to cause a downshift to second gear thereby to accelerate the vehicle, but subsequent release of the force imparted to the accelerator pedal immediately causes an upshift to third gear. It is thus impossible to carry out the desired drive by adjusting the amount of depression of the accelerator pedal. Further, on a descent or curve in a mountainous area, it is necessary to apply engine braking. With the shift pattern prepared for running on a level road, release of the force imparted to the accelerator pedal immediately results in the gear ratio of third gear, so that engine braking cannot be substantially applied. Further, it is necessary to cause a downshift when the acceleration must be started after the deceleration by means of engine braking in the manner described above. It will thus be seen that, in the case of running in a mountainous area with such an ideal shift pattern for a drive on a level road, the gear position influences the operation and it is impossible to carry out the desired driving conditions by adjusting the amount of depression of the accelerator pedal. Such defects are overcome by extending the second gear region of the shift pattern to a relatively high speed side. It has therefore been the common practice in prior art automatic transmissions to obviate these defects as much as possible at the sacrifice of the shift pattern selected for running on a level road. Various difficulties encountered with the prior art automatic transmission are obviated by the present invention in which a shift pattern for driving in a mountainous area, which is obtained by an extension of the second gear region to a relatively high speed side, is provided separately from an ideal shift pattern for running on a level road, so that these two shift patterns can be automatically switched over by an operating circuit adapted for detecting a gradient. By this arrangement, a suitable shift point can be automatically obtained under for all driving conditions, and an automatic shift operation which is more advanced than that in the conventional automatic transmissions can thereby be carried out.

Although an acceleration setting operating circuit is employed as a gradient detecting means in the embodiment described above, it will be apparent to those skilled in the art that a veriety of gradient detecting means including a level may be employed in lieu thereof. Further, although a signal responsive to the result of the detection of a gradient is employed as a signal for changing the shift pattern, the present invention in no way limits the shift pattern changing signal to such a said gradient signal. As will be apparent from the spirit of the present invention, it also includes a base in which an engine torque responsive signal and a vehicle speed responsive signal are used to change the shift pattern in lieu of a gradient signal so that the shift pattern can be suitably changed depending on the driving conditions in an urban area.

While the present invention has been described with reference to an automatic transmission having three forward speeds and one reverse speed, it will be apparent to those who can fully appreciate the technical contents of the present invention that many changes and modifications may be made therein without departing from the scope of the appended claims.

What is claimed is:

1. In an automatic transmission for a vehicle having a speed changing gear unit and frictionally engaging means for accomplishing the selective engagement of the gears in the speed changing gear unit, an automatic shift control system comprising: a hydraulic actuating circuit including a shift valve for distributing the working fluid to said frictionally engaging means for controlling said frictionally engaging means; means for generating an engine torque responsive signal; means for generating a vehicle speed responsive signal; a first shift point computing circuit for computing one of said two signals or computing the relation between said two signals; a second shift point computing circuit having a gradient operating circuit and controlled by a gradient responsive signal generated by said gradient operating circuit; and a circuit for delivering an electrical output signal in response to the application of one of the outputs from said two computing circuits so as to actuate said shift valve.

2. In an automatic transmission for a vehicle having a speed changing gear unit and frictionally engaging means for accomplishing the selective meshing engagement of the gears in the speed changing gear unit, an automatic shift control system comprising: a hydraulic actuating circuit including a manual valve and a shift valve for distributing the working fluid to said frictionally engaging means for controlling said frictionally engaging means; means for generating an engine torque responsive signal; means for generating a vehicle speed responsive signal; a first shift point computing circuit for generating a signal when the relation between said two signals satisfies a predetermined condition; a second shift point computing circuit including a gradient operating circuit for generating a signal when said engine torque responsive signal, said vehicle speed responsive signal and the rate of variation of said vehicle speed responsive signal satisfy predetermined conditions, an operating circuit for generating a signal when said engine torque responsive signal and said vehicle speed responsive signal satisfy other predetermined conditions, and a bistable memory circuit for continuously generating an output signal in response to the application of an input signal to one of input terminals thereof and continuously inhibiting the delivery of the output signal in response to the application of an input signal to the other input terminal thereof so that the output signal can be continuously delivered from said bistable memory circuit in response to the application of the output signal from said gradient operating circuit to one of said input terminals of said bistable memory circuit and the delivery of the output signal from said bistable memory circuit is continuously inhibited when the output signal from said operating circuit is applied to the other input terminal of said bistable memory circuit; and an OR circuit for delivering an output signal when one of the output signals from said first and second shift point computing circuits is applied thereto so as to actuate said shift valve.

3. In an automatic transmission for a vehicle having a speed changing gear unit, frictionally engaging means for accomplishing the selective engagement of the gears of said speed changing gear unit, and control means connected operatively to said frictionally engaging means for actuating said frictionally engaging means, an automatic shift control system comprising: a manual valve having a first position for establishing a relatively high forward driving ratio and a second position for establishing a relatively low forward driving ratio; a shift valve disposed in a communication passage between said shift region setting valve and said frictionally engaging means for selectively actuating said frictionally engaging means; biasing means engaging one end of said shift valve for biasing said shift valve in a direction giving the high forward driving ratio; solenoid means engaging the other end of said shift valve for urging said shift valve in the other direction giving the low forward driving ratio in response to the supply of current thereto; shift signal control means determining the supply of the current and the interruption of the current supplied to said solenoid means depending on the running conditions of the vehicle so as to vary the said shift valve in the corresponding direction; and switch means disconnectably connecting an electrical power source with said shift signal control means so that, in the closed position of said switch means in the first position of said manual valve, said shift signal control means actuates said shift valve to give the high forward driving ratio as well as the low forward driving ratio, while in the open position of said switch means, said shift signal control means is unable to carry out its control operation and said biasing means for said shift valve solely gives the high forward driving ratio.

4. In an automatic transmission for a vehicle having a throttle controlled engine, a driven member, a fluid pressure source connected to and driven by said engine, gear means having gear elements which define plural torque delivery paths between said engine and said driven member, and fluid pressure operated servos for controlling relative motion of the gear elements of said gear means to change a gear ratio, an automatic shift control system comprising: hydraulic actuating circuits for interconnecting said servos and said pressure source including shift valve means for selectively distributing fluid pressure from said source to said servos so as to change a gear ratio; solenoid means for operating said shift valve means; a source of voltage; means for generating a vehicle speed responsive signal; means for generating a throttle position responsive signal; a first shift point computing circuit including a differential amplifier for comparing said vehicle speed responsive signal and said throttle position responsive signal with each other and generating an output signal when the relation between said both signals satisfies a predetermined condition; a second shift point computing circuit including an operating circuit, a gradient operating circuit and a bistable memory circuit, said operating circuit setting said vehicle speed responsive signal and said throttle position responsive signal therein and generating an output signal when said signals satisfy a predetermined condition, said gradient operating circuit having a circuit for differentiating said vehicle speed responsive signal to compute an acceleration of the vehicle, setting said throttle position responsive signal, said vehicle speed responsive signal and a vehicle acceleration signal therein and generating an output signal when said signals satisfy a predetermined condition, and said bistable memory circuit being connected to receive the output signals of said operating circuit and said gradient operating circuit to establish a stable on-off state of output according to the states of said input signals; and an OR circuit connected to receive the output signals of said differential amplifier and said bistable memory circuit for generating an output signal of a logical sum of said input signals, the output of said OR circuit controlling energization of said solenoid means, whereby a gear ratio is changed according to the driven shaft responsive signal, the throttle position responsive signal and an acceleration of the vehicle.

5. An automatic shift control system as defined in claim 4, wherein said operating circuit comprises: a first throttle position setting operating circuit including reference voltage means connected to receive the throttle position responsive signal from a variable resistor and to conduct when the level of said signal exceeds that of the reference voltage; a first driven shaft speed setting operating circuit including reference voltage means connected to receive the driven shaft speed responsive signal from a frequency-DC voltage conversion circuit and to conduct when the level of said signal exceeds that of the reference voltage; and a first AND circuit connected to receive the output signals of said first throttle position setting operating circuit and said first driven shaft speed setting operating circuit for giving a logical product of said both input signals.

6. An automatic shift control system as defined in claim 4, wherein said gradient operating circuit comprises: a second throttle position setting operating circuit including reference voltage means connected to receive the throttle position responsive signal from a variable resistor and to conduct when the level of said signal exceeds that of the reference voltage; a second driven shaft speed setting operating circuit including reference voltage means connected to receive the driven shaft speed responsive signal and to conduct when the level of said signal exceeds that of the reference voltage; a low-pass filter connected to receive the driven shaft speed responsive signal for absorbing high frequency components of said speed signal; a differentiator connected with an output of said low-pass filter for differentiating the driven shaft speed responsive signal having an improved waveform, the output signal of said differentiator representing a differentiated value of the speed responsive signal or a signal representative of the vehicle acceleration; an acceleration setting operating circuit including reference voltage means and adapted to be energized when the acceleration signal exceeds a reference voltage; a delay circuit for receiving the output signal of said acceleration setting operating circuit and generating an output signal when the duration of the input signal is longer than a predetermined period of time; and a second AND circuit connected to receive the output signals of said second throttle position setting operating circuit, said second driven shaft speed setting operating circuit and said delay circuit for giving a logical product of said input signals.

7. In an automatic transmission for a vehicle having a throttle controlled engine, a driven member, a fluid pressure source connected to and driven by said engine, gear means having gear elements which define plural torque delivery paths between said engine and said driven member, and fluid pressure operated servos for controlling relative motion of the gear elements of said gear means to change a gear ratio, an automatic shift control system comprising: hydraulic actuating circuits for interconnecting said servos and said pressure source including shift valve means for selective distributing fluid pressure from said source to said servos so as to change a gear ratio; solenoid means for operating said shift valve means; a source of voltage; a variable resistor cooperating with a throttle valve to provide a voltage which varies with changes of the throttle position; a tachogenerator connected to a driven shaft for producing an AC voltage which varies with the speed of the driven shaft; a frequency DC voltage conversion circuit connected to the tachogenerator for converting the AC voltage into a DC voltage so as to develop a signal voltage proportional to the speed of the driven shaft; a potentiometer for modifying the signal voltage proportional to the speed of the driven shaft; switching contacts arranged to be operated by a switching relay for alternately connecting one of the frequency-DC voltage conversion circuit and the potentiometer; a differential amplifier connected to receive a throttle position responsive signal from said variable resistor and a driven shaft speed responsive signal from said switching contacts for comparing the throttle position responsive signal with the driven shaft speed responsive signal, said switching relay being connected to an output lead of said differential amplifier; a first throttle position setting operating circuit including reference voltage means connected to receive the throttle position responsive signal from said variable resistor and to conduct when the level of said signal exceeds that of the reference voltage; a first driven shaft speed setting operating circuit including reference voltage means connected to receive the driven shaft speed responsive signal from said frequency-DC voltage conversion circuit and to conduct when the level of said signal exceeds that of the reference voltage; a first AND circuit connected to receive the output signals of said first throttle position setting operating circuit and said first driven shaft speed setting operating circuit for giving a logical product of said both input signals; a second driven shaft speed setting operating circuit including reference voltage means connected to receive the driven shaft speed responsive signal and to conduct when the level of said signal exceeds that of the reference voltage; a low-pass filter connected to receive the drive shaft speed responsive signal for absorbing high frequency components of the driven shaft speed responsive signal; a differentiator connected with an output of said low-pass filter for differentiating the driven shaft speed responsive signal having an improved waveform, the output of said differentiator representing a differentiated value of the driven shaft speed responsive signal or a signal representative of the vehicle acceleration; an acceleration setting operating circuit including reference voltage means and adapted to be energized when the acceleration signal exceeds the reference voltage; a delay circuit for receiving the output signal of said acceleration setting operating circuit and generating an output signal when the duration of the input signal is longer than a predetermined period of time; a second AND circuit connected to receive the output signals of said second throttle position setting operating circuit, said second driven shaft speed setting operating circuit and said delay circuit for giving a logical product of said input signals; a bistable memory circuit connected to receive the output signals of the first AND circuit and the second AND circuit for establishing a stable on-off state of output according to the states of said input signals; and an OR circuit connected to receive the output signals of said differential amplifier and said bistable memory circuit for giving a logical sum of said both input signals, the output of said OR circuit controlling energization of said solenoid means, whereby a gear ratio is changed according to a change of an output siganl resulting from comparison between the driven shaft speed responsive signal and the throttle position responsive signal and also according to a change of an output signal resulting from comparison between a differentiated value of the driven shaft speed responsive signal, or a vehicle acceleration, and a reference vehicle acceleration.

8. In an automatic transmission for a vehicle having a throttle controlled engine, a driven member, a fluid pressure source connected to and driven by said engine, gear means having gear elements which define plural torque delivery paths between said engine and said driven emmber, and fluid pressure operated servos for controlling relative motion of the gear elements of said gear means to change a gear ratio, an automatic shift control system comprising: hydraulic actuating circuits for interconnecting said servos and said pressure source including a manual valve having a first position for establishing a relatively high forward speed ratio and a second position for establishing a relatively low forward speed ratio, a shift valve disposed in a communication passage between said manual valve and said servos for selectively supplying fluid pressure to said servos to change a gear ratio, spring means for biasing said shift valve in a direction establishing the high forward speed ratio, and solenoid means for urging said shift valve in the other direction establishing the low foraard speed ratio by overcoming the biasing force of said spring means when said manual shift valve is in said first position, said shift valve being biased by said spring means in the direction to establish the low forward speed ratio when said manual valve is in second position; a source of voltage; shift signal control circuits including means for generating a throttle position responsive signal voltage, means for generating a vehicle speed responsive signal voltage, a differential amplifier connected to receive the throttle position responsive signal voltage and to receive the vehicle speed responsive signal voltage for comparing said both signal voltages to generate an output signal by turning conductive when the throttle position responsive signal voltage is higher than the vehicle speed responsive signal voltage, and an amplifier for amplifying the output signal of said differential amplifier to energize solenoid means; and switch means disconnectably connecting said source of voltage with said shift signal control circuits, whereby when said switch means is in a closed position, the first position of said manual valve establishes the low forward speed ratio upon energization of said solenoid means by said shift signal control circuit and establishes the high forward speed ratio upon deenergization of the same, while when said switch means is in an open position, said shift signal control circuits do not operate and said solenoid means is in a deenergized state, whereas the first position of said manual valve establishes the high forward dpseed ratio and the second position thereof establishes the low forward speed ratio.

9. An improved shift control for use in a vehicle having an engine and automatic transmission including a gear change unit capable of being selectively established in any one of a plurality of forward driving gear ratios, including at least respective lower and higher speed gear ratios, when shifted thereinto, said shift control comprising:

load indicating means responsive to operational load characteristics of said vehicle for producing outputs indicative of variations of said load characteristics;

first shift point computing means responsively coupled to said load indicating means for operative coupling to said gear change unit to establish a change from said lower to higher gear ratio when said output indicates a certain load characteristic; and second shift point computing means including a gradient operating circuit responsively coupled to said load indicating means for operative coupling to said gear change unit to establish a change from said higher to lower gear ratio when an output thereof indicates a certain load characteristic corelative to a gradient exceeding a selected amount.

10. A shift control system as in claim 9, wherein said load indicating means includes:

vehicle speed and engine load responsive means; and means for coupling said responsive means to said vehicle for producing respective outputs indicative of vehicle speed and engine load.

11. An improved shift control system for use in a vehicle having an engine and automatic transmission including a gear change unit capable of being selectively established in any one of a plurality of forward driving gear ratios, including at least respective lower and higher speed gear ratios, when shifted thereinto, said shift control system comprising:

automatic transmission shifting means for automatically shifting said transmission from one to another of said driving gear ratios based upon certain vehicle conditions;

gradient responsive means for producing a given electrical output signal indicative of gradients exceeding a selected amount in accordance with operational load characteristics of the vehicle correlative to gradient; and means operatively coupled to said gradient responsive means and said automatic shifting means for causing said transmission, when it has been automatically shifted into said higher gear ratio by said shifting means, to be automatically shifted down from said higher to said lower gear ratio when said given electrical output occurs due to said selected amount of gradient being exceeded.

12. An improved electrical shift control system for use in a vehicle of the type driven by an engine having an automatic transmission system including a speed change gear unit coupled to said transmission for selectively accomplishing shifting said speed change gear unit as between a plurality of gear ratios including at least lower and higher gear ratios, and a hydrauilc actuation circuit for controlling said speed change gear unit including distributor valve means for selectively distributing a source of actuating fluid under pressure thereto, and an electrical shift control system for controlling the operation of said distributor valve means and hence the shift as between said gear ratios, said improved electrical shift control system comprising:

vehicle responsive means including engine load responsive means and vehicle speed responsive means for producing output signals indicative of the respective conditions of said load and speed responsive means;

first shift point computing means responsively coupled to said vehicle responsive means for producing selected outputs in response to the occurrence of respective relationships of said output signals for selectively activating said distributor valve means for shifting said gear unit as between said higher and lower ratios in accordance with said respective output signals;

second shift point computing means responsively coupled to the vehicle responsive means and including a gradient operating circuit for producing an output indicative of gradients exceeding a selected amount in accordance with operational load characteristics of the vehicle correlative to said gradient; and means including circuit means responsively coupled to said gradient circuit for operatively controlling said distributor valve means in accordance with said gradient circuit output thereby modifying the shifting of said vehicle upon the encounter of gradients exceeding the selected amount.

13. An improved shift control system as in claim 12, wherein said circuit means is coupled to said first shift point computing means output and the output of said gradient circuit for delivering respective signals to said distributor valve means and comprises:

bistable memory means, having two stable states, and responsively coupled to said gradient circuit for producing an output in one of its stable states in response to the output thereof indicative of the gradient exceeding the selected amount for activating said distributor valve, and producing no output in its other stable state in response to the gradient circuit output indicative of the gradient less than the minimum amount, and OR circuit means responsive to said bistable means and said first shift point computing means for activating said distributor valve to effect shifting of said gear unit in accordance with the presence or absence of an output of said OR means.

14. An improved shift control system as in claim 12 wherein said engine is throttle controlled and said load responsive means includes: means responsive to the degree of actuation of said throttle for establishing a signal indicative thereof.

15. An improved shift control system as in claim 12, wherein said vehicle speed responsive means includes: a generator coupled to the outout of the transmission and driven thereby for producing a variable output in accordance with the rotational speed thereof, indicative of vehicle speed.

16. An improved shift control system as in claim 12, for use with the said transmission system when the gear unit is shiftable between at least low, medium, and high gear ratios, the latter two being said lower and higher ratios, and said distributor valve means includes first and second distributor valves, said shift control system further including a third shift point computing means responsively coupled to said vehicle responsive means for providing outputs to control said first distributor valve, the combined outputs of said first and second shift point computing means being operable to control said second distributing valve.

17. An improved shift control system as in claim 16 wherein said second shift point computing circuit means further includes: second means responsive to the vehicle responsive means for producing selected outputs in response to the occurrence of respective different relationships thereof for effecting gear engagements different from those provided by said first distributor valve.

18. An improved shift control system as in claim 17 further including: bistable circuit means having two stable states and responsively coupled to said gradient circuit for producing an output in one of its stable states in response to the output thereof indicative of the gradient exceeding said selected amount for activating said second distributor valve and producing no output in its other state in response to the gradient circuit output indicative of less than the selected amount, and OR circuit means responsive to said bistable means and said second shift point computing means for activating said second distributor valve to effect shifting of said gear unit in accordance with the presence or absence of an output of said OR means.

19. An improved shift control system as in claim 12, wherein said gradient response operating circuit includes: means responsively coupled to said vehicle responsive means for producing a first output upon the occurrence of a vehicle speed less than a selected minimum, an engine load greater than a selected maximum, said output being indicative of a road inclination greater than a selected degree and for further producing a second output in response to a respective engine load and vehicle speed respectively less than and greater than selected amounts for indicating level road conditions.

20. An improved shift control system as in claim 19 wherein said engine is throttle controlled and said load responsive means includes: means responsive to the degree of actuation of said throttle for establishing a signal indicative thereof and accelerometer means responsive to said speed responsive means for producing an output indicative of vehicle acceleration.

21. An improved shift control system as in claim 20 wherein said gradient responsive operating circuit means includes: first AND circuit means responsive to selected outputs of said vehicle responsive means including the vehicle speed response means, the accelerometer means, and the throttle responsive means, for producing an output for activating said bistable means to its first condition, and second AND circuit means responsive to selected outputs of said vehicle response means including the vehicle speed and throttle responsive means for activating said bistable means to its second condition.

22. An improved shift control system as in claim 21 further including OR circuit means coupled to said bistable means output and the second shift point computing means for producing an output when either of said means is producing its selected output for activating said distributor valve means.

23. An improved shift control system as in claim 20 wherein said first and second shift point computing means each include:
shift point operating means responsive to said vehicle responsive means including the throttle degree responsive means and the vehicle speed detector for delivering an output in response to selected relationships of the signals therefrom.

24. An improved shift control system as in claim 23, wherein said shift point computing means each further include:
means responsively coupled to said vehicle speed detector output, for providing a modulated version thereof, selection means for controlling the input of said shift point computing means for coupling the modulated version of said vehicle speed output thereto in response to the output of said shift point operating means, said modulated version of said vehicle speed output being attenuated so as to provide hystersis to said shift point computing means.

25. An improved shift control system as in claim 24, wherein shift point computing circuit includes a comparator for sensing the relative magntidues of the throttle position detector output and the vehicle speed detector output and producing its output in accordance with a preset relation.

26. an improved shift control system as in claim 12 further including a manual shift valve for distributing said fluid; and switch means for coupling an electrical power source to said control means, operatively coupled to said shift valve for rendering said electrical control system inoperative to effect said automatic shifting of said gear unit when said manual shift valve is moved from an automatic to a manual mode.

* * * * *

UNITED STATES PATENT OFFICE
CERTIFICATE OF CORRECTION

Patent No. 3,747,438                    Dated July 24, 1973

Inventor(s) Eiji Toyoda; Shin Ito; Seitoku Kubo

It is certified that error appears in the above-identified patent and that said Letters Patent are hereby corrected as shown below:

<u>IN THE HEADING</u>

Please add:

--[30]  Foreign Application Priority Data

March 25, 1969        Japan.........22567/69 --

Signed and sealed this 19th day of February 1974.

(SEAL)
Attest:

EDWARD M. FLETCHER, JR.              C. MARSHALL DANN
Attesting Officer                     Commissioner of Patents